US012652186B2

(12) United States Patent

Phillips et al.

(10) Patent No.: US 12,652,186 B2
(45) Date of Patent: *Jun. 9, 2026

(54) ADVANCED ROUTING AND REMOTE RENDERED VIDEOS LAYOUT FOR MEETING SIDE GROUP CONVERSATIONS AND VOICE ASSISTANT PROVIDERS

(71) Applicant: Adeia Guides Inc., San Jose, CA (US)

(72) Inventors: Christopher Phillips, Hartwell, GA (US); Reda Harb, Saint Petersburg, FL (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/959,256

(22) Filed: Nov. 25, 2024

(65) Prior Publication Data

US 2025/0330343 A1 Oct. 23, 2025

Related U.S. Application Data

(63) Continuation of application No. 18/087,308, filed on Dec. 22, 2022, now Pat. No. 12,192,017.

(51) Int. Cl.
| | |
|---|---|
| *H04L 12/18* | (2006.01) |
| *H04L 65/1093* | (2022.01) |
| *H04L 65/403* | (2022.01) |

(52) U.S. Cl.
CPC ...... *H04L 12/1822* (2013.01); *H04L 65/1093* (2013.01); *H04L 65/403* (2013.01)

(58) Field of Classification Search
CPC ............. H04L 12/1822; H04L 65/1093; H04L 65/403
See application file for complete search history.

(56) References Cited

U.S. PATENT DOCUMENTS

| | | | | |
|---|---|---|---|---|
| 11,665,215 B1* | 5/2023 | Zavesky | ................. | H04L 65/61 709/219 |
| 11,671,472 B1* | 6/2023 | Waibel | ................ | H04L 65/4015 709/205 |
| 2005/0276405 A1* | 12/2005 | Fernandes | ............... | H04M 3/56 379/202.01 |
| 2021/0399911 A1* | 12/2021 | Jorasch | ............... | H04L 12/1818 |

(Continued)

*Primary Examiner* — Christopher B Robinson
*Assistant Examiner* — Tania M Pena-Santana
(74) *Attorney, Agent, or Firm* — HG LAW LLP

(57) ABSTRACT

Systems and methods for routing audio and/or video streams and remote rendered video layout for conference side group conversations and voice assistant providers are disclosed. During a main conference comprising a plurality of users, a request is received to create a side group conversation comprising a subgroup of the plurality of users. A voice assistant provider is invited to the side group conversation. Users in the subgroup may be granted different permissions to query or receive responses from the voice assistant. Incoming audio and video streams from each user are demultiplexed and decoded. Decoded audio streams are processed by an appropriate audio mixer of the group and voice assistant. Decoded video streams are processed and rendered based on a video grouping render policies. Processed audio streams for each group and voice assistant and/or rendered videos are encoded and routed to each user through their dedicated multiplexer.

20 Claims, 11 Drawing Sheets

(56) References Cited

U.S. PATENT DOCUMENTS

| | | | | |
|---|---|---|---|---|
| 2022/0353472 A1* | 11/2022 | Lee | ..................... | H04L 12/1818 |
| 2023/0007063 A1* | 1/2023 | Gupta | .................. | H04L 65/403 |
| 2023/0246861 A1* | 8/2023 | Waibel | ................. | G06F 3/0482 |
| | | | | 709/204 |

* cited by examiner

700

1100

ADVANCED ROUTING AND REMOTE RENDERED VIDEOS LAYOUT FOR MEETING SIDE GROUP CONVERSATIONS AND VOICE ASSISTANT PROVIDERS

CROSS-REFERENCE TO RELATED APPLICATION

This application is a continuation of U.S. patent application Ser. No. 18/087,308, filed Dec. 22, 2022, the disclosure of which is incorporated by reference in its entirety.

BACKGROUND

The present disclosure relates to routing of audio and/or video streams and remote rendering of videos in a web conference. In particular, systems and methods are described herein for routing audio and/or video streams and remote video rendering to enable side group conversations in a conference call. Systems and methods are also described for routing the audio and/or video streams and remote video rendering to allow voice assistant services from multiple providers to be included in a main conference and a side group conversation during a video conference.

SUMMARY

The use of video calling devices to allow participants to communicate with each other using video and audio is becoming increasingly widespread. Video calling is supported on many devices, such as smart phones, smart speakers with touch screens, among others. As more users use video calling to participate in virtual meetings, it can be desirable during a video conference to start a side conversation (e.g., huddle) as participants would in a physical meeting (e.g., attendees can participate in the main conference, but also have a side conversation with a subgroup of the participants sitting nearby, wherein the side conversation remains relatively isolated from the main conference). User may also want to engage the services of voice assistant providers to the main conference and/or side group conversations. Accordingly, there is a need for improved techniques for enabling participants in a video call to initiate a side conversation while remaining part of the main video conference, while routing the appropriate audio and video streams to the participants. Further, improved techniques are needed for allowing voice assistant services from multiple voice assistant providers to be included in the main conference and/or side group conversations, while routing responses of the voice assistant to the appropriate groups and participants.

In accordance with some embodiments disclosed herein, some of the above-mentioned limitations are overcome by running, by a server, a conference session, wherein a plurality of participants attends the conference session; receiving, from a client device, a request to create a side conversation from the conference session; creating, by a server, a side conversation from the conference session; inviting, by a server, a subgroup of the plurality of participants to the side conversation; and inviting, by a server, a voice assistant to the side conversation.

According to some embodiments, the limitations are further overcome by routing audio and/or video streams associated with the conference session between the plurality of participants; and at substantially the same time, routing audio and/or video streams associated with the side conversation between the subgroup of the plurality of participants.

According to some embodiments, the described invention also comprises routing audio and/or video streams associated with the voice assistant between the subgroup of the plurality of participants and the voice assistant based on a voice assistant permissions policy. The voice assistant permissions policy may comprise permitting at least one of the subgroup to at least query the voice assistant or receive responses from the voice assistant.

According to some embodiments, the described invention also comprises inviting a second voice assistant to the side conversation.

According to some embodiments, the described invention also comprises creating a second side conversation from the conference session; and inviting a second subgroup of the plurality of participants to the second side conversation, wherein the second subgroup includes at least one participant from the first-referenced subgroup. In further embodiments, the described invention also comprises inviting the voice assistant to the second side conversation.

According to some embodiments, the described invention further comprises managing, based on preferences of the client device, output features associated with the audio and/or video streams associated with the conference sessions, the audio and video streams associated with the side conversation, and the audio and/or video streams associated with the voice assistant.

According to some embodiments, the described invention also comprises configuring a video grouping for rendering at the client device, wherein the video grouping comprises a list of participants sorted by group conversations.

According to some embodiments, the described invention also comprises enabling a participant to speak in conference session while participating in the side conversation.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

Figure 1:
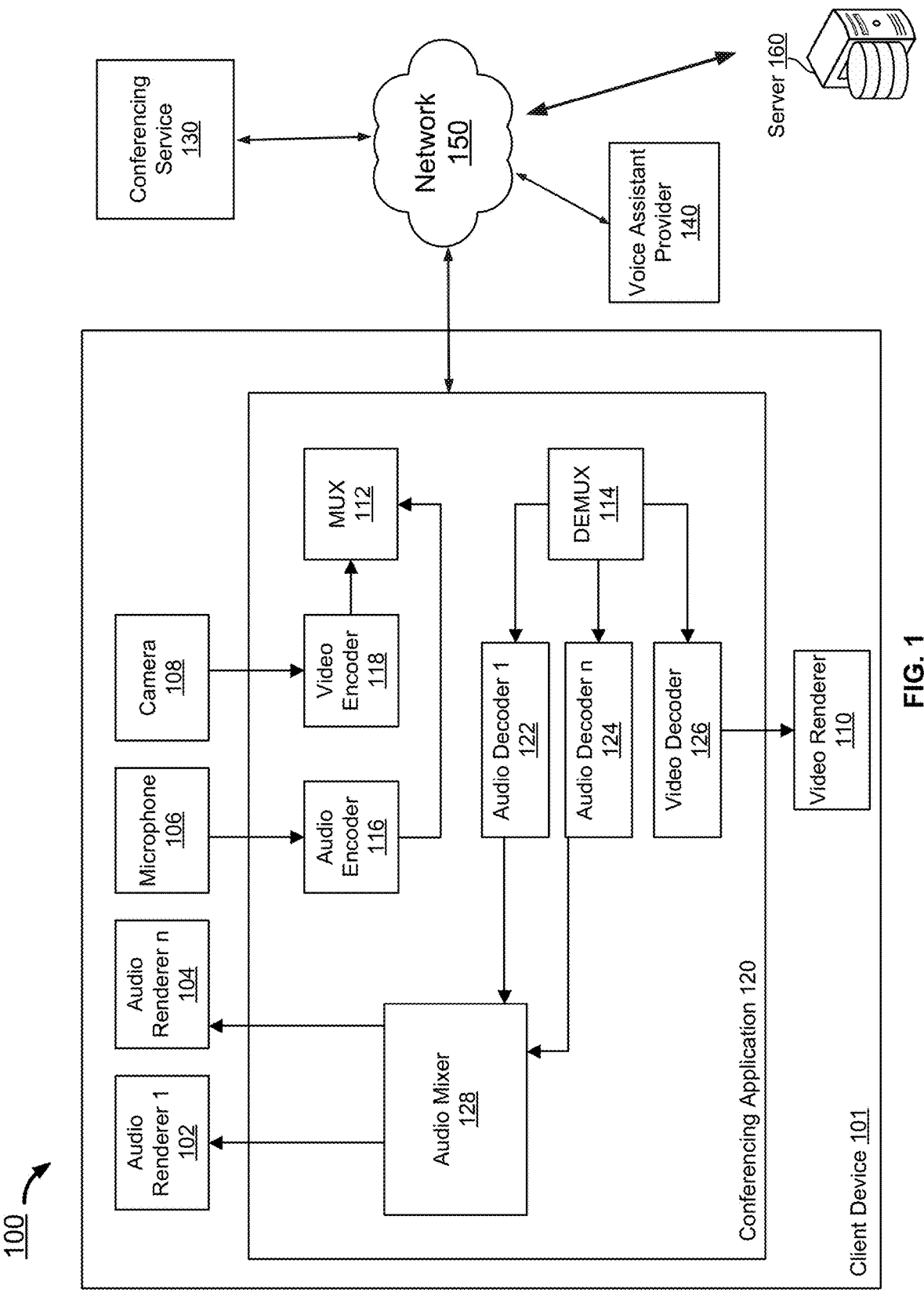
FIG. 1 shows an example environment for advanced routing of audio and/or video streams and remote video rendering for side group conversations and voice assistant providers in a conference, in accordance with some embodiments of this disclosure.

FIG. 1 shows an example environment 100 for advanced routing of audio and/or video streams and remote video rendering for side group conversations and voice assistant providers in a conference, in accordance with some embodiments of this disclosure. According to some embodiments, a conference (also referred to as a conference meeting) can be an audio only conference meeting, a video only conference meeting, or a conference meeting with both audio and video. In an embodiment, the environment 100 comprises client device 101, conferencing application 120, conferencing service 130, voice assistant provider 140, network 150, and server 160. In the example, client device 101 comprises audio renderers 102, 104, microphone 106, camera 108, and video renderer 110. Conferencing application 120 comprises multiplexer 112, demultiplexer 114, audio encoder 116, video encoder 118, audio decoders 122 and 124, video decoder 126, and audio mixer 128.

The disclosed methods and systems may be implemented on one or more client devices 101. As referred to herein, client device 101 can be any device comprising a processor and memory, for example a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, a gaming console, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, or any other television equipment, computing equipment, or wireless device, and/or combination of the same.

Client device 101 may operate in a cloud computing environment to access cloud services. In a cloud computing environment, various types of computing services for content sharing, storage, or distribution (e.g., video sharing sites or social networking sites) are provided by a collection of network-accessible computing and storage resources, referred to as "the cloud." For example, the cloud can include a collection of server computing devices (such as, e.g., server 160), which may be located centrally or at distributed locations, that provide cloud-based services to various types of users and devices connected via a network such as the Internet via network 150. In such embodiments, a plurality of client devices 101 may operate in a peer-to-peer manner without communicating with a central server.

Network 150 may be one or more networks including the Internet, a mobile phone network, mobile voice or data network (e.g., a 4G or LTE network), cable network, public switched telephone network, or other types of communications network or combinations of communications networks. Paths (e.g., depicted as arrows connecting the respective components to network 150) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths.

In an embodiment, client device 101 is associated with a user who is participating in a conference meeting (e.g., a main audio and/or video conference comprising a plurality of participants) by way of conferencing application 120 supported on client device 101. In another embodiment, the conferencing application 120 may be implemented by way conferencing service 130 running on a server 160, such as a proprietary server associated with conferencing service 130. The user can participate in the conference, such as speaking and sharing video, receiving audio and video from other participants in the conference, and the like. The user can also join multiple groups, for example, by simultaneously attending the main conference while starting and/or participating in a side group conversation comprising a subgroup of the plurality of participants. Conversations in the side group conversation are isolated from other groups. When the user participates in the side group conversation, only other users in the side group can access the user's side group audio and video. In another embodiment, the user may also invite a virtual voice assistant provider (also referred to as voice assistant or voice assistant provider) to the side group conversation, wherein the voice assistant provider can provide voice assistant services directly to users of that group. The user may also set permissions to access the voice assistant for each user in the group. For example, some users in the group may be permitted to query the voice assistant and/or receive responses from the voice assistant, denied any access to the voice assistant, etc. Systems and methods, in particular, audio and/or video stream routing techniques, as described herein, enable a user to participate in multiple groups (e.g., a main conference and at least a side group conversation) without needing to leave one for the other, and to invite virtual voice assistant provider services to at least one of the group meetings.

In an embodiment, incoming audio and/or video streams from each group in which the user is a participant, may be transmitted from conferencing service 130 to conferencing application 120. Prior to transmission, the incoming audio and/or video streams are encoded and multiplexed. The incoming streams are routed to a dedicated demultiplexer 114 of the user, which demultiplexes the streams into separate audio streams corresponding to each group that the user is in, and a video stream. For example, if the user joins two groups (e.g., the conference and a side group conversation), the incoming audio streams may comprise an audio stream 1 corresponding to audio of participants in the conference and an audio stream 2 corresponding to the audio of participants in the side group conversation. In an embodiment, the (incoming) video stream comprises a single stream multiplexed from bitstreams from corresponding feeds (e.g., of each group, or of participants of each group, in which the user is a member) from conferencing service 130 to be sent to the user. A dedicated audio decoder may be instantiated for each audio stream from each group in which the user is participant. In the example, audio stream 1 is routed to audio decoder 122 (e.g., audio decoder 1), and each audio stream for each additional group which the user joins may be routed to audio decoder 124 (e.g., audio decoder n). The decoded audio streams may be routed to audio mixer 128 to mix the audio from the streams (e.g., balance, optimize, equalize, adjust volume, muting controls, etc.). The mixed audio output is then routed to audio renderer 102, such as a speaker on device 101, a Bluetooth device with audio functionality, or is routed over HDMI to a monitor, and so forth. In an embodiment, audio mixer 128 may be used to manage individual output features associated with the audio of the conference and any groups in which the user is participating. For instance, audio mixer 128 may mix the audio such that the audio output for the conference is rendered at a higher volume than that of the side group, or the audio output of one group is muted while playing the audio of another group at specific times or during particular activity levels of the user (e.g., whether user is actively participating in a particular group at the time). In an example, the user may attend the main conference and a side group conversation and receive audio streams from both groups. If a speaker is presenting in the main conference, audio mixer 128 may mute all other users (including the user himself in the example), except for the speaker (e.g., the user will only hear the voice of the speaker in the main conference).

In another embodiment, additional renderer 104 may be used, wherein each renderer renders the audio of a different group to different speakers on client device 101 (e.g., main conference audio stream is routed to audio renderer 102 and side group audio stream is routed to audio renderer 104). Meanwhile, any corresponding video stream may be routed to video decoder 126. Once decoded, the video stream may be rendered at video renderer 110. Video renderer 110 may be located on client device 101 or may be located on an edge device or remote server 160. Video renderer 110 may be located on client device 101 or may be located on an edge device or remote server 160. Video renderer 110 may render the decoded video stream based on a video grouping render policy (also referred to as a video render layout policy) which defines (for the particular user) how to group the video feeds of whichever groups that the user is in.

In an embodiment, outgoing audio and video streams from the user may be transmitted from client device 101 (by way of conferencing application 120) to conferencing service 130. Microphone 106 and camera 108 capture the user's audio and video input, respectively. The corresponding audio and/or video streams are routed to audio encoder 116 and video encoder 118, respectively. The encoded audio and/or video streams are routed to the user's dedicated multiplexer 112, which multiplexes the encoded audio and/or video streams in a single stream prior to transmission over network 150 to conferencing service 130. In another embodiment, the audio and/or video streams may be multiplexed, and the streams transmitted over network 150 separately to different ports on the same IP address. In an embodiment, the outgoing audio and/or video streams of the user are routed only to the corresponding decoders, mixers, and processors of the groups that he is a member of. Thus, if the user is a member of the conference and the side group conversation, his outgoing audio streams associated with his participation in the conference would be routed to the conference audio mixer and his outgoing audio streams associated with his participation in the side group conversation will be routed to the side group audio mixer. Likewise, if a second side conversation is created but to which the user is not invited, the outgoing audio and video streams of the user will not be routed to the second side conversation.

In an embodiment, voice assistant provider 140 (also referred to as virtual voice assistant or voice assistant) may be invited (e.g., by a host, such as the user) to a group to provide voice assistant services to the group participants. Voice assistant provider 140 may be any assistant implemented via a combination of software and hardware. Typically, voice assistant provider 140 receives a query, and performs an action in response to the query. Voice assistant provider 140 may be implemented via an application running on a computing device, such as a laptop, smartphone and/or tablet, such as Microsoft Cortana, Samsung Bixby or Apple Siri. In another example, voice assistant provider 140 may be implemented via dedicated hardware, such as an Amazon Alexa smart speaker or a Google Nest smart speaker. Typically, voice assistant provider 140 may respond to a command comprising a wake word, or phrase, and are put in a mode for receiving a query following the wake word, or phrase. A query may include, for example, requesting that a song is played, or media is streamed, requesting that an item is added to a list, ordering an item for delivery, playing a game, requesting a news update and/or requesting a weather update. Voice assistant provider 140 may directly perform the action. In other examples, voice assistant provider 140 may perform the action via a third-party application. This may comprise, for example, passing the query to the application via an application programming interface (API). In some examples, the query may comprise instructing the virtual assistant via a skill.

In an embodiment, the user (e.g., host of the voice assistant provider 140) may set permissions for each user in the group to access the services of voice assistant provider 140. All users or a subset of users may be permitted to query the voice assistant provider 140, receive responses from voice assistant provider 140, query and receive responses, or be restricted to interacting with voice assistant provider 140 during the group session. In another embodiment, voice assistant provider 140 may be invited to multiple groups. In yet another embodiment, multiple users in a group may invite their own voice assistant provider. If the user is permitted to receive audio streams from voice assistant provider 140 in a group, an additional audio stream may be included in the incoming stream to the demultiplexer 114, and a new audio decoder may be instantiated to decode the audio stream of the voice assistant provider 140's audio from the group.

Figure 2:
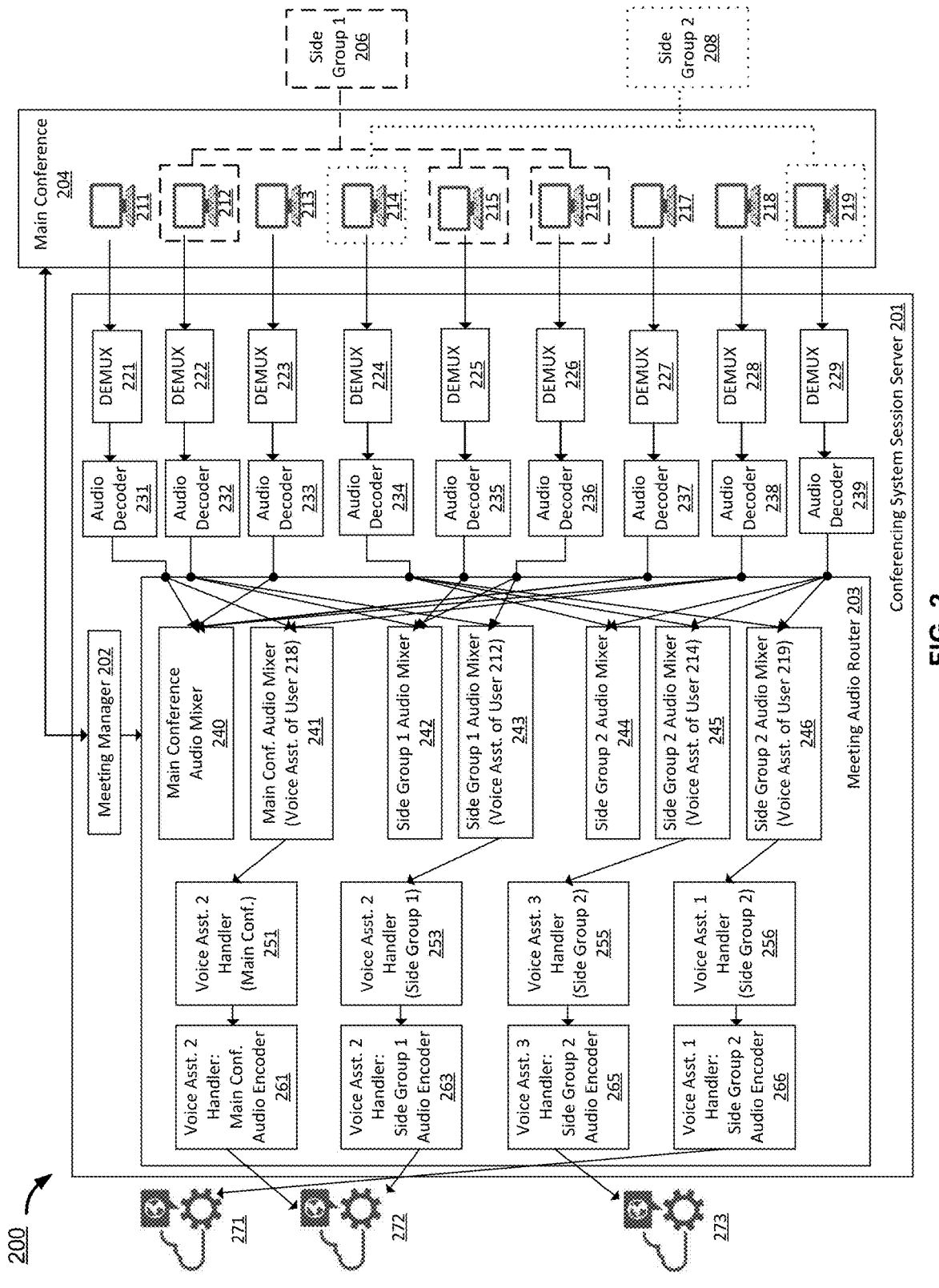
FIG. 2 shows an illustrative technique for routing incoming audio streams to a main conference, side group conversation, and voice assistant providers in a conference, in accordance with some embodiments of this disclosure.

FIG. 2 shows an illustrative technique 200 for routing incoming audio streams to a main conference, side group conversation, and voice assistant providers in a video conference, in accordance with some embodiments of this disclosure. In an embodiment, conferencing system session server 201 is operable to support (e.g., provide a platform for) a conference application (such as conferencing application 120 of FIG. 1), on which a main conference 204 (also referred to as a main meeting) is run. In an embodiment, main conference 204 may be an audio only conference. In other embodiments, main conference 204 may be a conference meeting with audio and video. In yet another embodiment, main conference 204 may be a video only conference (discussed in further detail in FIG. 4). Incoming and outgoing audio and/or video streams from the conference application (e.g., from user input by way of their associated client devices) are sent to and from the video conferencing system session server 201, respectively.

According to some embodiments, meeting manager 202 is operable to create and manage groups (e.g., main meeting and side group conversations), manage participants of the groups (e.g., users and virtual voice assistant providers), and set routing policies for audio and/or video streams between users and voice assistant providers within the groups. Meeting manager 202 may receive a request by a user to create a group. The request may include a list of participants (e.g., other users) which the requesting user wishes to invite to the group. Meeting manager 202 may send to each user the group invitation, which the user may accept or decline. The group is created and those users who accept the invitation are added to the group. In an embodiment, the first created group is the main conference, wherein all users participate (e.g., main conference 204, wherein all users 211-219 join). Routing policies for audio and/or video streams exchanged in the group may be set based on members of the group. For example, audio and/or video streams may be routed such that only audio and/or video associated with a group (e.g., conversations by the users in the group) remains within that group (e.g., are routed only to those users of that group).

In an embodiment, during the main meeting, meeting manager 202 may present an option to any user in the main conference to start a side group conversation (also referred to as a side conversation, side group, or huddle). A user may select the option to request creation of a side group conversation and invite a subgroup of the users from the main conference. In the example, user 212 requests to create side group conversation 206 and invites users 215 and 216. Meeting manager 202 sends an invitation to each user (e.g., users 215 and 216) of the subgroup. When a user accepts the invitation, the user is added to the side group conversation. The user can then participate in both the main conference and the side group conversation. In another embodiment, a user can join multiple side group conversations (in addition to joining the main conference). Users outside the side group conversation (e.g., not invited and added to the side group conversation) can only participate in the main conference (and other side group conversations in which they are added). In an embodiment, a routing policy may be set for each group such that audio and/or video streams associated with each group are confined to the group. Thus, when users participate in the main conference, their audio and/or video streams can be routed between all users in the main conference. Meanwhile, when the subgroup of users participates in the side group conversation, audio and/or video streams of the side group conversation can be routed between the subgroup only. This allows users in the subgroup to alternate between participating in the main conference and side group conversation and maintain separate conversations simultaneously. This also allows users to be a part of both the main conference and side group conversation (as well as any additional side group conversations) at the same time, without having to exit one group in order to join the other. In another embodiment, routing policies may be set for the user based on which group they are in. For example, audio and/or video streams may be routed such that the user can alternate between groups and can converse (e.g., exchange audio and/or video) with the appropriate users in whichever group he is actively participating. In another embodiment, other suitable routing policies may be set for allowing a user to participate in multiple groups. Further in the embodiment, meeting manager 202 may present an option to a user while in a side group conversation to also speak in the main conference, without terminating or exiting the side group conversation. The user may also choose to stop speaking in the main conference and resume the side group conversation.

In an embodiment, a user in a group can host services from their voice assistant provider (also referred to as voice assistant) in a group in which the user is participating. In an embodiment, a voice assistant provider can be a virtual voice assistant application to which services the user subscribes, such as Amazon Alexa, Apple Siri, and so forth. The services of the virtual voice assistant application may be provided over a network in response to a request by a user device. In another embodiment, voice assistant provider may be a smart device or virtual assistant functionality in a computing device associated with the user, and the like. In other words, a user may share their voice assistant service (e.g., associated with their voice assistant provider, such as Amazon Alexa voice assistant program, etc.) with other users in the group. For example, a user who subscribes to a voice assistant provider may wish to utilize its services during the main conference and/or a side group conversation that the user is in. Upon a request by the user to invite their voice assistant to a particular group, meeting manager 202 may add the voice assistant to the designated group. Like users, a voice assistant can join multiple groups. For instance, a first user may attend a main conference and a side group conversation, and his voice assistant can accompany him in both groups. In the example, voice assistant provider 272 is invited to both main conference 204 and side group conversation 206. In another embodiment, multiple users may add their voice assistant to the group in which the users are in. For instance, a first user may add their Apple Siri-enabled voice assistant to a side group conversation, while a second user in the side group conversation can add their Google-enabled voice assistant. In the example, user 219 invites voice assistant provider 271 in side group conversation 208 and user 214 invites voice assistant provider 273 in the same group. In some embodiments, prior to adding the voice assistant provider to the group, meeting manager 202 may identify the voice assistant provider and determine whether another instance of the same voice assistant provider is already present in the group. If the same voice assistant provider is already present, meeting manager 202 may deny the request to include any additional instances of the voice assistant provider to prevent ambiguities in wake word detection between the voice assistants. For example, if a first user requests to add to a group his Amazon Alexa-enabled voice assistant, but the group already has another Amazon Alexa-enabled voice assistant (e.g., of a second user), meeting manager 202 may deny the request. This prevents false or multiple wake word triggering, for example, both Amazon Alexa-enabled voice assistants in the group respond when a user utters "Alexa."

Routing policies may be set for each voice assistant based on which group the voice assistant is in. For example, in a group with a voice assistant, audio and/or video streams are routed such that queries from users made during conversations in the group are directed to the voice assistant and corresponding responses from the voice assistant are directed to the users of that group. In an embodiment, routing policies for audio and/or video streams relating to voice assistants may be based on permissions policies for using the voice assistants. For example, different permissions policies may be set for each user in relation to the voice assistant, such as selecting which users in the group can submit queries to his voice assistant. Permissions policies may be set based on users, groups, a combination thereof, etc. For example, when a user invites his voice assistant to a side group conversation of five users, the user may set permissions such that all five users in the group can hear and/or view the voice assistant's responses to queries, but only he and one other user may be permitted to submit a query to the voice assistant. Routing policies may be set such that incoming audio and video streams (e.g., queries) to the voice assistant may only come from the two users with querying privileges, while outgoing audio and/or video streams (e.g., query responses) from the voice assistant to the group may be routed to all five users in the group. In an example, the permissions are limited to the group. Thus, if a user is restricted from sending queries to another user's voice assistant when they are in one side group conversation, that user may be permitted to send queries to that same voice assistant when they are in a different side group conversation. In another example, the user may be restricted from sending queries to any instance of particular voice assistant, regardless of which group the user is in.

In an embodiment, meeting manager 202 manages termination of groups and removal of users and voice assistants from groups. For example, a user who requested creation of a side group conversation may also request termination of the side group conversation. Meeting manager 202 may process the termination request by removing all users and voice assistants from the group. Routing policies for the side group are removed, but routing policies remain the same for other groups that are still active (e.g., although the side group conversation has ended, the users can continue to participate in the main conference and/or other side group conversations. In another embodiment, meeting manager 202 may terminate the groups automatically. For example, all side group conversations may end automatically when the main conference ends (e.g., which the main conference may be preconfigured to terminate at a particular time, or the host user may terminate manually, etc.).

According to some embodiments, meeting audio router 203 is operable to implement the routing policies. Based on the routing policies, meeting audio router 203 can configure various media processing components and route the streams between the components, users, and voice assistants. When a group is created and users and voice assistants are added to the group, routing policies may be set such that audio and/or video streams associated with each group are confined to the group. In an embodiment, for incoming audio (e.g., from users to conferencing system session server 201), meeting audio router 203 may instantiate a dedicated demultiplexer and dedicated audio decoders for each user in the main conference 204. For example, incoming audio and/or video from users may be received by conferencing system session server 201 as multiplexed and encoded audio and/or video streams (e.g., user input may be encoded and multiplexed at the user's device prior to being transmitted to conferencing system session server 201). The dedicated demultiplexers can be configured to demultiplex the input (e.g., an incoming multiplexed audio and/or video stream) from the appropriate user into a separate audio stream and/or video stream. The (encoded) audio stream is routed to the appropriate user's dedicated audio decoder. In another embodiment, the incoming audio stream may be accompanied by a corresponding incoming video stream. Processing the incoming video stream, if any, is discussed in further detail in FIG. 4.

In an embodiment, a dedicated audio mixer may be instantiated for each group to process the demultiplexed and decoded audio stream. For each group with a voice assistant, a dedicated audio mixer may also be instantiated for the voice assistant in that group. The audio mixer may be configured to implement audio mixer policies, such as muting or adjusting audio levels for each incoming audio stream.

Figure 3:
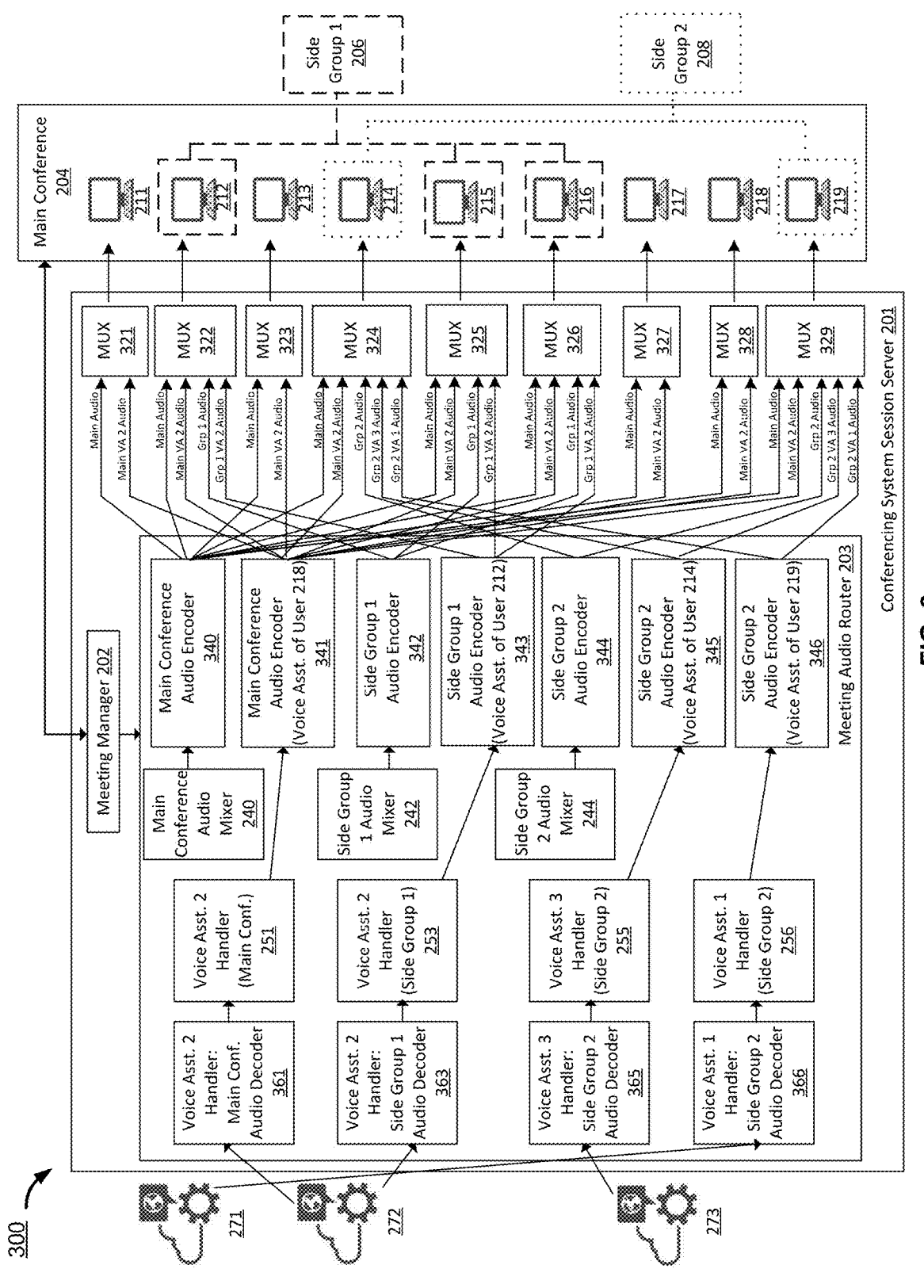
FIG. 3 shows an illustrative technique for routing outgoing audio streams to a main conference, side group conversation, and voice assistant providers in a conference, in accordance with some embodiments of this disclosure.

For outgoing audio streams (e.g., from conferencing system sessions server 201 to users) meeting audio router 203 may instantiate a dedicated multiplexer for each user and dedicated audio encoders for each group and each voice assistant per group, discussed in further detail in further detail in FIG. 3. In another embodiment, the outgoing audio stream is transmitted with a corresponding outgoing video stream. Processing outgoing video streams, if any, is discussed in further detail in FIG. 4.

In the example, users 211-219 join main conference 204. Routing policies may be set such that all conversations held in the main conference 204 will be directed to and from all users and voice assistants in the main conference 204. For each user 211, 212, 213, 214, 215, 216, 217, 218, and 219, meeting audio router 203 may assign a dedicated demultiplexer 221, 222, 223, 224, 225, 226, 227, 228, and 229, respectively, to demultiplex any (multiplexed and encoded) incoming audio and/or video input from the users to conferencing system session server 201. Meeting audio router 203 may also assign to each user a dedicated audio decoder 231, 232, 233, 234, 235, 236, 237, 238, and 239, respectively. A dedicated audio mixer 240 may be assigned to the main conference 204. In an example, a user 211 may make a presentation during the main conference. Audio and/or video streams from user 211 (e.g., of his presentation) may be encoded and multiplexed at his computing device, prior to being transmitted to conferencing system session server 201. The incoming audio and/or video streams of user 211 can be received by demultiplexer 221, which demultiplexes the streams into an (encoded) audio stream and (encoded) video stream. The audio stream can be routed to audio decoder 231 for audio decoding, while the video stream can be routed to video decoder 421 for video decoding (discussed in further detail in FIG. 4). Other users may participate in the main conference 204 conversation at the same time. Further in the example, while incoming audio and/or video streams of user 211 are routed to his assigned demultiplexer 221, audio decoder 231 and/or video decoder 421, the incoming audio and/or video streams from the input of user 212 can be routed to her assigned demultiplexer 222, audio decoder 232 and/or video decoder 421, and so forth for each respective user 213, 214, 215, 216, 217, 218, and 219.

Meeting audio router 203 may instantiate a dedicated audio mixer 240 for the main conference 204, to which all incoming decoded audio streams from all users in the main conference 204 can be directed. In an embodiment, audio mixer 240 optimizes the incoming audio streams into a final mono, stereo, or surround-sound product (e.g., as an outgoing stream). Audio mixer 240 may receive multiple streams (e.g., multiple tracks) from a plurality of users attending the main conference 204 and adjust, balance, equalize and compress individual tracks, groups of tracks, or the overall mix of tracks prior to transmitting the audio of main conference 204 as an outgoing audio stream to all users in main conference 204.

In an embodiment, incoming audio streams from a user is routed to the audio mixer of each group he is in as well as the audio mixer of each voice assistant he has permission to access. In the example, user 218 invites his voice assistant 272 to main conference 204. User 218 may set permissions for each user in main conference 204 to access services of his voice assistant. For instance, while all users 211-219 may access audio streams of the query response from voice assistant 272 during main conference 204, only users 211 and 218 may be permitted to send voice queries or instructions voice assistant 272. In an embodiment, when voice assistant 272 is added to main conference 204, meeting audio router 203 may instantiate within main conference 204 a dedicated audio mixer 241 and a dedicated audio encoder 261 for voice assistant 272. Audio streams of users permitted to query voice assistant 272 may be routed to both the group audio mixer (e.g., allowing other members of the group to hear the query) and the audio mixer for the voice assistant (e.g., allowing for wake word detection by the voice assistant). For example, when user 218 queries voice assistant 272, his audio and/or video streams may be routed to his assigned demultiplexer 228 to separate the audio stream from the video stream (if any), the audio stream is further routed to his assigned audio decoder 238 (and any video stream is routed to his assigned video decoder 428 in FIG. 4), and the decoded audio stream is routed to main conference audio mixer 240, so that all other users attending the main conference 204 can hear his query. Additionally, his decoded audio stream may be routed to main conference audio mixer 241 for voice assistant 272. Once mixed, the audio stream is routed to voice assistant handler 251, which performs wake word detection on the audio stream. If voice assistant handler 251 detects the appropriate wake word associated with voice assistant provider 272, the audio stream can be routed to audio encoder 261. Audio encoder 261 then encodes the (decoded) audio stream so that meeting audio router 203 can transmit (e.g., over a network) the encoded audio stream to voice assistant provider 272. Corresponding outgoing streams (e.g., comprising responses from voice assistant 272 to the voice query) may be routed to all users 211-219 in main conference 204. Similarly, user 211 may also query voice assistant 272. When user 211 directs a query or instructions to voice assistant 272, his audio (and video streams, if any) are routed to demultiplexer 221, audio decoder 231 (and video decoder 421, if applicable), both audio mixers 240 and 241, voice assistant handler 251, voice assistant audio encoder 261, and voice assistant provider 272.

For all other users in main conference 204 without permission to query voice assistant 272, their audio streams (e.g., after demultiplexing and decoding) will be routed to main conference audio mixer 240. For example, if user 213 attempts to query voice assistant 272, his audio would be handled as if it were any other audio stream from him (for example, conversations directed to other users in the main conference, without a wake word). So even if user 213 queries voice assistant 272 using the appropriate wake word, his audio stream will not be routed to the voice assistant audio mixer 241, voice assistant handler 251, voice assistant audio encoder 261, or voice assistant provider 272. Rather, his audio stream will only be routed to main conference audio mixer 240.

Further in the example, user 212 creates a side group conversation 206 and invites a subgroup of users (e.g., users 215 and 216). Routing policies for side group conversation 206 may be set such that access to all audio and/or video streams of the group are restricted to the subgroup of users (e.g., only users 212, 215 and 216 can hear and/or see what others are saying or doing within side group conversation 206). Meanwhile, routing policies for main conference 204 for users 212, 215, and 216 persist, allowing the three users to participate in both main conference 204 and side group conversation 206 (e.g., at substantially the same time or alternating between the groups, etc.). In an embodiment, meeting audio router 203 instantiates a dedicated audio mixer for the new side group (e.g., side group audio mixer 242). Any incoming streams associated with side group conversation 206 from the appropriate users will be directed to side group audio mixer 242 instead of main conference audio mixer 240. Meeting manager 202 may detect which group user 212 is speaking in (e.g., the destination of the incoming audio and/or video streams), such as by way of a user interface element for user 212 to select between speaking in main conference 204 or side group conversation 206, each of which may be associated with a unique group ID. In the situation where user 212 is speaking in main conference 204, her audio may be routed to demultiplexer 222, audio decoder 232, and main conference audio mixer 240, and corresponding outgoing streams would be directed to all users 211-219 of main conference 204. In the situation where user 212 is speaking in side conversation 206, her audio may be routed to demultiplexer 222, audio decoder 232, and side group audio mixer 242, and corresponding outgoing streams would be directed to only users 215 and 216 of the side group conversation 206. In an embodiment, a user may decline an invitation to a side group conversation, and such user will not be included in the routing policy for the side group conversation. For example, if user 217 was invited but declines to join side group conversation 206, no audio or video streams will be routed between user 217 and side group audio mixer 242.

In the example, user 212 invites voice assistant provider 272 to side group conversation 206. Permissions policies may be set such that query responses from voice assistant 272 are accessible to all three users in side group conversation 206, but voice assistant 272 may only accept queries from users 212 and 216. In an embodiment, audio streams of permitted users (e.g., who are allowed to query the voice assistant within the group) will be routed to both the group audio mixer and the audio mixer for the voice assistant in that group. For example, audio and/or video streams comprising a query from user 212 may be demultiplexed by demultiplexer 222 and the audio stream decoded by audio decoder 232 (and video decoder 422, if the query includes a corresponding video stream). The decoded audio stream is routed to and processed by side group audio mixer 242 (e.g., allowing users 215 and 216 to hear the query) as well as routed to and processed by side group audio mixer 243 for voice assistant 272 (e.g., allowing for voice assistant handler 253 to perform wake word detection on the audio stream). Once voice assistant handler 253 detects the appropriate wake word for activating voice assistant 272, audio meeting router 203 may route the audio stream to voice assistant audio encoder 263 to encode the stream in a compressed format for transmission to voice assistant provider 272. From there, voice assistant 272 can decode and process the query, and its response may be transmitted in a corresponding outgoing stream back to users 212, 215, and 216 within side group conversation 206. Similarly, user 216 is permitted to submit queries to voice assistant 272, so their audio streams (and any corresponding video stream) can be routed to demultiplexer 226, the separated audio stream to audio decoder 236, and the decoded audio stream to both side group audio mixer 242 and side group audio mixer 243 (e.g., for voice assistant 272). Side group audio mixer 242 can process the audio stream and the corresponding outgoing stream can be routed back to the other users in side group conversation 206. Side group audio mixer 243 for voice assistant 272 can process the audio stream and further direct it to voice assistant handler 253 for wake word detection. Upon detecting the appropriate wake word associated with voice assistant 272, the audio stream continues to voice assistant audio encoder 263, which encodes the stream in a transmissible format to voice assistant provider 272. From there, voice assistant 272 can decode and process the query, and its response may be transmitted in a corresponding outgoing stream back to the users 212, 215, and 216 within side group conversation 206.

For all other users in a group lacking permission to query the voice assistant in the group, such as user 215, their audio streams may only be routed to the group audio mixer (e.g., and not the audio mixer for the voice assistant). In the example, if user 215 attempts to query voice assistant 272 and utters the appropriate wake word, his audio stream will continue to be routed through demultiplexer 225, audio decoder 235, and side group audio mixer 242. Unless he is subsequently granted permission to query voice assistant 272, his audio stream will not be routed to side group audio mixer 243 for voice assistant 272.

In the example, voice assistant 272 is added to multiple groups. User 212 and user 218 can both subscribe to services of the same voice assistant provider (e.g., voice assistant 272). While user 212 invites voice assistant 272 to side group conversation 206, user 218 can also invite voice assistant 272 to main conference 204. If user 218 is subsequently added to side group conversation 206, he may be restricted from inviting (a second instance of) voice assistant 272, thereby removing redundancies in stream routing and complications with wake word detection that arise from multiple instances of the same voice assistant provider. In yet another embodiment, a voice assistant may be shared between users. For example, voice assistant 272 may belong to user 218, which user 218 invites to main conference 204. User 218 may set permissions for voice assistant 272 to allow user 212 to invite his (e.g., user 218) voice assistant to another group (e.g., side group conversation 206).

In another example, user 219 creates side group conversation 208 and invites his voice assistant provider 271 and, also invites user 214. Upon joining the group, user 214 invites her own voice assistant provider 273. Both users give each other query access to their respective voice assistant providers (e.g., hence, both users 214 and 219 can use both voice assistant providers 271 and 273). Moreover, voice assistant providers 271 and 273 are different providers, eliminating potential false wake word triggers or other wake work complications that may arise from duplicate instances of the same provider in the same group. In an embodiment, incoming audio streams from a user is routed to the audio mixer of the group in which he is currently speaking as well as the audio mixer of each voice assistant he has permission to access in that group. Thus, when user 219 is actively participating in main conference 204 (and he does not have permission to access to the voice assistant in main conference 204), his incoming audio may be routed only to the main conference audio mixer 240. When user 219 is actively participating in side group conversation 208, his incoming audio may be routed to side group audio mixer 244, side group audio mixer 245 (for voice assistant 273), and side group audio mixer 246 (for voice assistant 271). Because voice assistants 273 and 271 are different providers (e.g., are associated with different wake words), an incoming query of user 219 can be routed to handlers 255 and 256 of both voice assistants, respectively, without risk of false or duplicate wake word triggering.

Likewise, when user 214 (who also does not have permission to access the voice assistant 272 in main conference 204) is actively participating in main conference 204, her incoming audio stream is directed to main conference audio mixer 240 only. When user 214 is actively participating in side group conversation 208, her incoming audio may be routed to side group audio mixer 244, side group audio mixer 245 (for voice assistant 273), and side group audio mixer 246 (for voice assistant 271).

FIG. 3 shows an illustrative technique 300 for routing outgoing audio streams to a main conference, side group conversation, and voice assistant providers in a conference, in accordance with some embodiments of this disclosure. As described above, incoming audio and/or video streams (e.g., input from user to conferencing system session server 201) can be multiplexed and encoded at each user's device, and routed to the user's dedicated demultiplexer (e.g., wherein the multiplexed streams are separated into an audio stream and/or a video stream), the user's dedicated decoders (e.g., comprising an audio decoder for the audio stream and a video decoder for the video stream), and the audio mixer of the group (e.g., in which user is currently speaking). Additionally, the user's audio stream may be routed to the audio mixer of any voice assistant whose services the user has access to in the group. Meeting audio router 203 may route corresponding outgoing streams (e.g., conference output) from conferencing system session server 201 to the users. In an embodiment, outgoing audio streams may be routed from the group audio mixer to the group's audio encoder, to the multiplexer of the appropriate user (e.g., only to users attending the particular group), and transmitted to the user at the users' device. In another embodiment, where the user utilizes a voice assistant in the group, audio streams comprising the voice assistant's response are routed from an audio decoder of the voice assistant, to the voice assistant handler, to an audio encoder of the voice assistant within the group, to the multiplexer of the appropriate user (e.g., users in the particular group who are permitted to receive responses from the voice assistant) and transmitted to the user at the user's device. Further in the embodiment, outgoing audio streams can be routed from multiple groups (e.g., multiple group audio mixers) to the same user at substantially the same time (e.g., an outgoing stream from one group is not terminated in order for an outgoing stream to be routed from another group), such that the user can participate in multiple groups simultaneously without needing to leave one group for the other. In other words, the techniques described allow the user to not be restricted to attending only one group at a time. For instance, user 212 is in multiple groups (e.g., main conference 204 and side group conversation 206) and has permission to interact with voice assistant 272 in both the main conference 204 and side group conversation 206. Thus, for user 212, six streams may be routed to her dedicated multiplexer 322: encoded outgoing audio streams from the main conference 204, the voice assistant 272 responses in the main conference 204, the side group conversation 206 and voice assistant 272 responses in the side group conversation 206, and video streams from the main conference 204 and from the side group conversation 206.

In the example, incoming audio (e.g., from multiple users speaking) to main conference 204 is processed by main conference audio mixer 240. Once main conference audio mixer 240 has processed the audio (for example, by optimizing the incoming audio streams of multiple users speaking in main conference 204 into mono, stereo, or surround-sound signals, balancing and equalizing the streams, etc.), the audio is routed as an outgoing stream from audio mixer 240 to the users of main conference 204. The outgoing audio stream is routed to main conference audio encoder 340, which may encode the audio stream into a format for storage and/or transmission to the users of main conference 204. Meanwhile, any corresponding outgoing video stream from main conference 204 is processed and encoded by a dedicated video encoder for each user (discussed in further detail in FIG. 4). The encoded audio stream (and encoded video stream, if any) for each user is routed to the appropriate multiplexer (e.g., multiplexers 321-329) for each user (e.g., users 211-219, respectively). The final multiplexed and encoded streams are then transmitted to each user at their respective computing devices.

Further in the example, responses from voice assistant provider 272 in main conference 204 are routed as outgoing audio streams (e.g., response streams) to all users in main conference 204 permitted to receive such responses (e.g., all users 211-219). Similarly, responses from voice assistant provider 272 in side group conversation 206 are routed to all users in side group conversation 206 permitted to receive such responses (e.g., users 212, 215, and 216). Incoming queries (e.g., from permitted users 211 and 218) are routed over the network to and processed by voice assistant provider 272 (for example, on a proprietary server of the voice assistant provider). The corresponding response to the queries may be encoded and transmitted as an outgoing audio stream from voice assistant provider 272 to conferencing system session server 201. In an embodiment, a dedicated audio decoder, voice assistant handler, and audio encoder are instantiated for voice assistant 272 per group. Since voice assistant 272 is added to main conference 204 and side group conversation 206, meeting audio router 203 may instantiate audio decoder 361, voice assistant handler 251, and audio encoder 341 for voice assistant's 272 responses to users of main conference 204, as well as instantiate another audio decoder 363, voice assistant handler 253, and audio encoder 343 for voice assistant's 272 responses to users of side conversation 206. In an embodiment, meeting audio router 203 may identify to which group (e.g., main conference 204 or side group conversation 206) a response stream from voice assistant 272 should be directed. For example, a group ID may be associated with the stream, which meeting audio router 203 may have assigned to the corresponding query stream when it was received by conferencing system session server 201 from a user. When the response stream is determined to be associated with main conference 204 (e.g., its corresponding query stream originated from a conversation in main conference 204), the stream is routed to audio decoder 361 (e.g., of voice assistant 272 in main conference 204), which decodes the stream. The decoded audio stream is routed back to voice assistant handler 251 (e.g., of main conference 204), which can further process the voice assistant response into a user perceivable format, for example by way of text to speech or other machine translation mechanisms. The response stream continues to audio encoder 341 (of voice assistant 272 in main conference 204), which encodes the stream into a format for transmission to the users of main conference 204. The encoded audio stream is routed to the appropriate multiplexer (e.g., multiplexers 321-239) of each user (e.g., users 211-219, respectively). The multiplexer of each user may multiplex the encoded audio stream (and corresponding encoded video stream, if any, which is discussed in FIG. 4) into a single output stream for transmitting over a network to the user at the user's device.

In an embodiment, setting voice assistant permissions may include selecting which users in the group can access the voice assistant responses (e.g., can listen to response audio from the voice assistant). For such a user, the outgoing stream route from the voice assistant provider to the user may be removed. For example, the response stream from the voice assistant provider is routed to the multiplexers of the permitted users, but not to the multiplexer of the restricted user.

Figure 4:
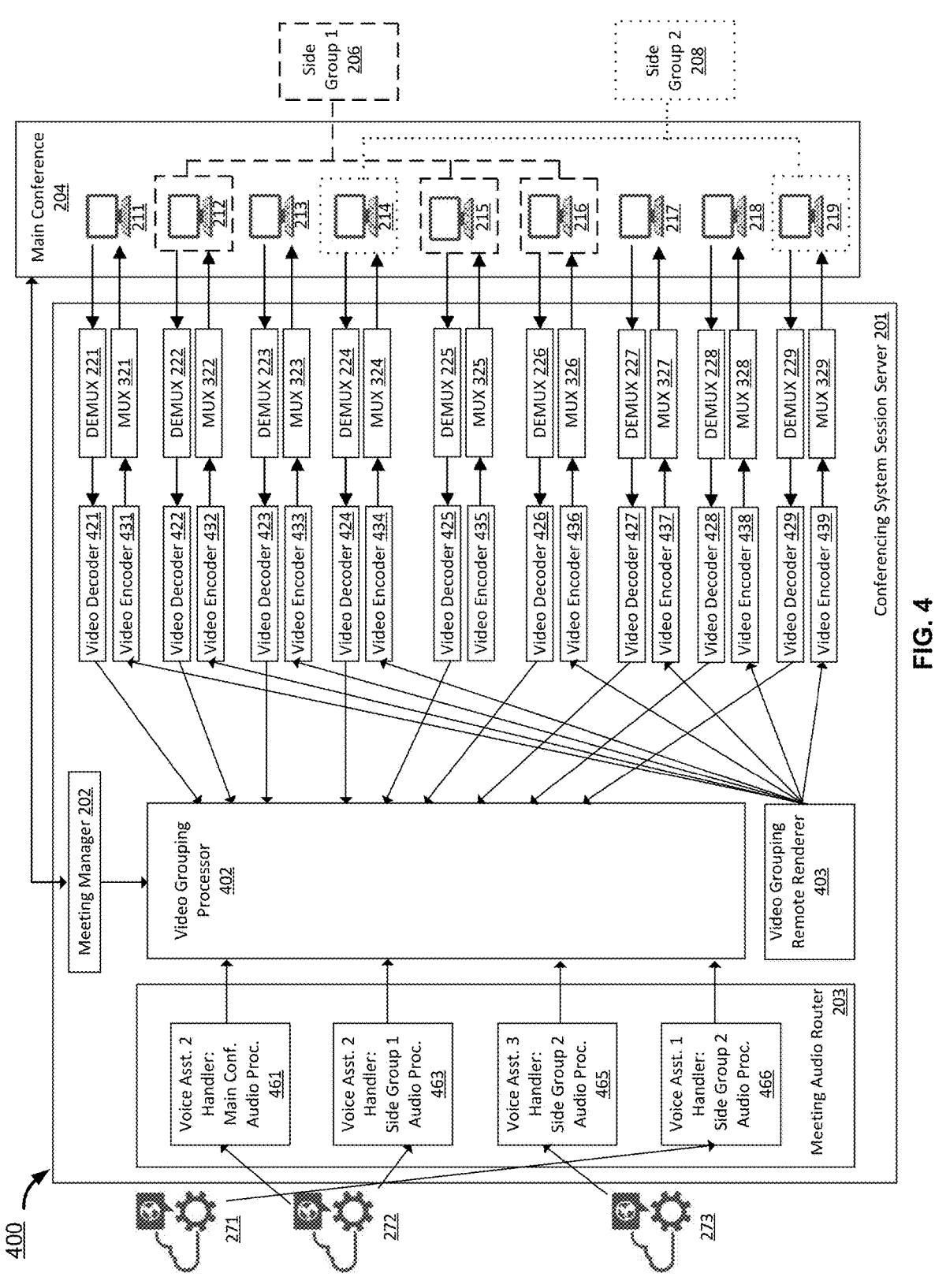
FIG. 4 shows an illustrative technique for processing and routing incoming and outgoing video streams and remote rendering of video for side group conversations in a conference, in accordance with some embodiments of this disclosure.

FIG. 4 shows an illustrative technique 400 for routing incoming and outgoing video streams and remote rendering of video for side group conversations in a conference, in accordance with some embodiments of this disclosure. According to some embodiments, the conference may be a conference with audio and video. In other embodiments, the conference may be a video only conference (e.g., with no audio). In an embodiment, video input from users is routed to the appropriate groups at conferencing system session server 201, and corresponding rendered video output is routed back to the users. According to some embodiments, meeting manager 202 is operable to configure video stream routing policies and video grouping render policies (also referred to as video render layout policies). Video groupings (also referred to as layouts) may comprise static or dynamic templates comprising UI elements based on the user and/or the groups which the user is in, and may be customized by the user. For example, a template for a user may include thumbnail displays of participants of all of the groups in which the user is attending. The template may allow the user to change one or all of the thumbnail displays of participants and control the views (e.g., side-by-side view, gallery view, etc.). In an embodiment, the UI elements may be associated with metadata corresponding to a particular video stream (such as the group ID of the video stream). In an embodiment, video grouping processor 402 may process graphics, perform the video grouping, and create a video for each participant of the conference, all on the server 201. Also in the embodiment, video grouping remote renderer 403 may remotely render the video grouping on server 201. The video may comprise a single video stream, wherein video feeds from participants in the groups in which the user is in are grouped into the single encoded video stream.

According to some embodiments, video grouping processor 402 is operable to receive incoming video streams and perform graphics layout (video grouping) based on the video grouping render policies. For example, video grouping processor 402 may receive incoming video streams from each user in each group and metadata relating to each stream such as group ID, user ID, whether a voice assistant is associated with the group and which permissions a user may have for accessing the voice assistant, etc. Video grouping processor 402 may also receive streams from voice assistant providers and metadata relating to the streams, such as video notifications that the voice assistant has a response to transmit or that the voice assistant is awaiting a query. In an embodiment, for each received and decoded video stream, video grouping processor 402 may define or configure the video grouping based on the group ID, user ID, etc. associated with the stream.

According to some embodiments, video grouping remote renderer 403 is operable to receive the decoded video streams and remotely render the video groupings (e.g., as defined by video grouping processor 402). Video group remote renderer 403 may remotely render the video groupings, graphics for voice assistant inputs (e.g., queries) and responses, graphical effects around displays of the side groups, and so forth. In an embodiment, remote rendering may be performed on the server 201 along with the video processing (e.g., video grouping processor 402). In another embodiment, the remote rendering may be performed on the network edge. Once rendered, the rendering is encoded and multiplexed as a single video stream (e.g., comprising bitstreams from corresponding video feeds from each group that the user is expected to receive) and is transmitted to the client device associated with each user.

In an embodiment, for routing incoming video streams, a dedicated demultiplexer and dedicated video decoder may be instantiated for each user. For example, video input (and corresponding audio input, if any) from user 211 may be received, by conferencing system session server 201, as a multiplexed and encoded stream. The input is routed to demultiplexer 221, which demultiplexes the stream into separate audio stream and/or video stream. While the audio stream (if any) is routed to audio decoder 231, the video stream is routed to video decoder 421 to be decoded. The decoded video is routed to video grouping processor 402, which processes input video streams from all users (e.g., wherein each user may have a different video grouping, for example, due to being in different combinations of groups, and video feeds from appropriate participants in such groups are grouped together for the particular user). The processed video is then routed to video grouping remote renderer 403, which remotely renders the appropriate video grouping for each user.

In an embodiment, for routing outgoing video streams, the appropriate rendered video is routed from video grouping remote renderer 403 to each user. In the example, for user 211, the rendered video is routed to video encoder 431, and the encoded rendered video and the encoded audio (see FIG. 3) are multiplexed at multiplexer 321. The final multiplexed and encoded video and audio stream is then transmitted over the network to user 211 at his device. In another embodiment, a user 212 may participate in two groups (e.g., main conference 204 and side group conversation 206). Video streams from both groups, along with any corresponding audio streams from both groups and response streams from voice assistants from both groups (e.g., a total of six streams), may be routed to her dedicated multiplexer 322. According to an embodiment, both video streams are combined in a single video stream in a video grouping particularly configured for user 212, wherein upon rendering, the video comprises two windows (e.g., one for video streams of each group) and the single video stream is routed to the dedicated video encoder 432 and then multiplexed with the audio streams of the main conference 204 and audio stream of side group conversation 206 at her dedicated multiplexer 322 before transmitting to her computing device over the network.

In an embodiment, video grouping render policies may specify the graphical user interface elements for indicating various features of the group sessions and the arrangement of such elements when rendering the video. Video in the policies may comprise static or dynamic templates (layouts) comprising UI elements based on the user and/or the groups which the user is in, and may be customized by the user. In an embodiment, video grouping render policies are based on the group (e.g., identity of the groups, which groups are in progress, which groups are available for new participants, etc.), or the user (e.g., which groups the user is active in), etc. For example, an icon (or avatar, picture in picture video, etc.) of each user in the main conference is displayed on each user's device. Icons of users who are in a side group conversation may have a bounding box of a color (or other graphical style) corresponding to the side group, indicating that such users are in the particular side group. The icons may be rearranged such that participants in each group are placed adjacent to each other as displayed on the user's device. In another embodiment, icons may be rearranged such that participants in the same group as the user may be placed adjacent to each other and in a particular position on the screen (such as near the top or being of larger size than icons of other users not in the same group, etc.), as displayed on the user's device. In another example, in a display on a user's device, multiple windows may correspond to the multiple groups that the user is in, wherein within each window the appropriate group's video is streamed. Different colored bounding boxes or other border styles may outline each window. For example, on the display of user's 212 device, a blue bounding box may be placed around the window for the main conference 204 video, while a yellow bounding box may be placed around the window for the side group conversation 206 video. Meanwhile, the display of user's 211 device may include a single blue bounding box around the window for the main conference 204 video, as he is only added to the main conference 204 and not to any side group conversations. Different border styles for group windows may indicate which group the user is currently speaking in. In another embodiment, other GUI elements may be used to indicate the occurrence of other activity in or status of a particular group.

In another embodiment, where a user is a participant in multiple groups, a single window may be displayed for the group in which the user is currently active. Further in the embodiment, meeting audio router 203 may allow for the user to receive video for the user's participation in a side group conversation while allowing him to speak the main conference. For example, user 212 is a participant in both main conference 204 and side group conversation 206, and may be currently active in (e.g., speaking directly to other users in) side group conversation 206. A single window at user's 212 device may be rendered to stream the video feed of the side group conversation 206, while user is actively participating (e.g., speaking) in side group conversation 206 (e.g., incoming audio from user 212 is routed to side group audio mixer 240 but routing to main conference audio mixer 242 is paused). While active in side group conversation 206, user 212 may choose to temporarily speak in main conference 204 without stopping the video feed for side group conversation 206. Meeting audio router 203 may enable speaking in main conference 204 for user 212 and route her audio to main conference 204 while routing video from side group conversation 206 to her. When the user is finished speaking, meeting audio router 203 may continue routing video from side group conversation 206 to user 212 and disable speaking for user 212 in main 204 and resume routing her audio to side group conversation 206.

In an embodiment, the video contents of a group (e.g., display of the users in that group, the video feed of the group conversation, etc.) are viewable only by the members of that group. The layout of each group's window includes a display of the users of that group. The window may include an arrangement of individual video feeds of each user attending that group, an arrangement of icons corresponding to each user, a list of all users attending the group, and the like. For example, all users can receive video feeds of all other users participating main conference 204. However, only users 212, 215, and 216 can view videos of each other's participation in side group conversation 206 (e.g., other users not in side group conversation 206 cannot view any video from this group). Thus, video processing (e.g., by video grouping processor 402) for users 212, 215, and 216, may include grouping video feeds from the main conference and from side group conversation 206 into a single video stream (for each user 212, 215, and 216). Meanwhile, video processing for users 214 and 219 may include grouping video feeds from the main conference and from side group conversation 208 into a single video stream (for each user 214 and 219). This results in only users 214 and 219 being able to view video of each other's participation in side group conversation 208.

In an embodiment, each group may be associated with a fixed layout. For example, the layout of main conference 204 may display a list of users attending each side group conversation. The users for each side group conversation may be sorted and displayed adjacent to each other. When a video conference session begins, a main conference 204 may be initiated and in the window of the main conference 204 video, all users in attendance (e.g., users 211-219) can be listed (e.g., in a default order, such as alphabetically, by time of joining the conference, etc.). When side group conversation 206 is created, icons of users 212, 215, and 216 in the main conference video window may be arranged adjacent to each other and/or displayed with a formatting style (e.g., bounding box of a specific color, such as orange, a particular background shade behind each user icon, etc.) corresponding to side group conversation 206. Similarly, when side group conversation 208 is created, icons of users 214 and 219 in the main conference video window may be arranged adjacent to each other and/or displayed with another formatting style (e.g., bounding box of another color such as purple, or a purple background shade behind each user icon, etc.) corresponding to side group conversation 208. In another embodiment, the layout of each group may include customizable aspects per user. For example, for users in side group conversation 206, the group layout may generally include a list of all three users. However, for user 212, the display may be customized to arrange her avatar at the top of her list, while the display for user 215 may include the avatar of 215 at the top of his list, and so forth. Further in the embodiment, the video grouping for each user (e.g., arrangement of video feeds from all of the groups that the user is in) may be fixed or may be customizable by the user.

In some embodiments, when a group includes a voice assistant, the rendered video layout for the group may include an icon representing the voice assistant's presence, which may be viewable only by members of the group. A user interface element may be rendered when a user interacts with the voice assistant, for example, a user interface element for indicating when the voice assistant is receiving or responding to a query, such as highlighting the voice assistant icon, highlighting an avatar of the querying user, and so forth.

Figure 5B:
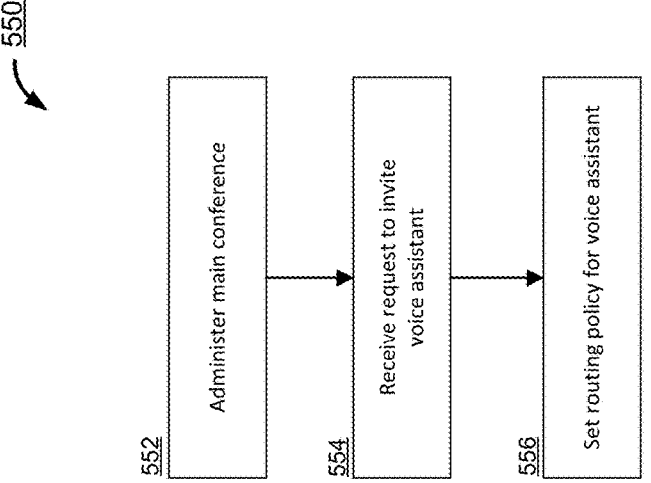
FIG. 5B is a flowchart showing illustrative steps involved in inviting a voice assistant provider to a side group conversation, in accordance with some embodiments of this disclosure.
Figure 5A:
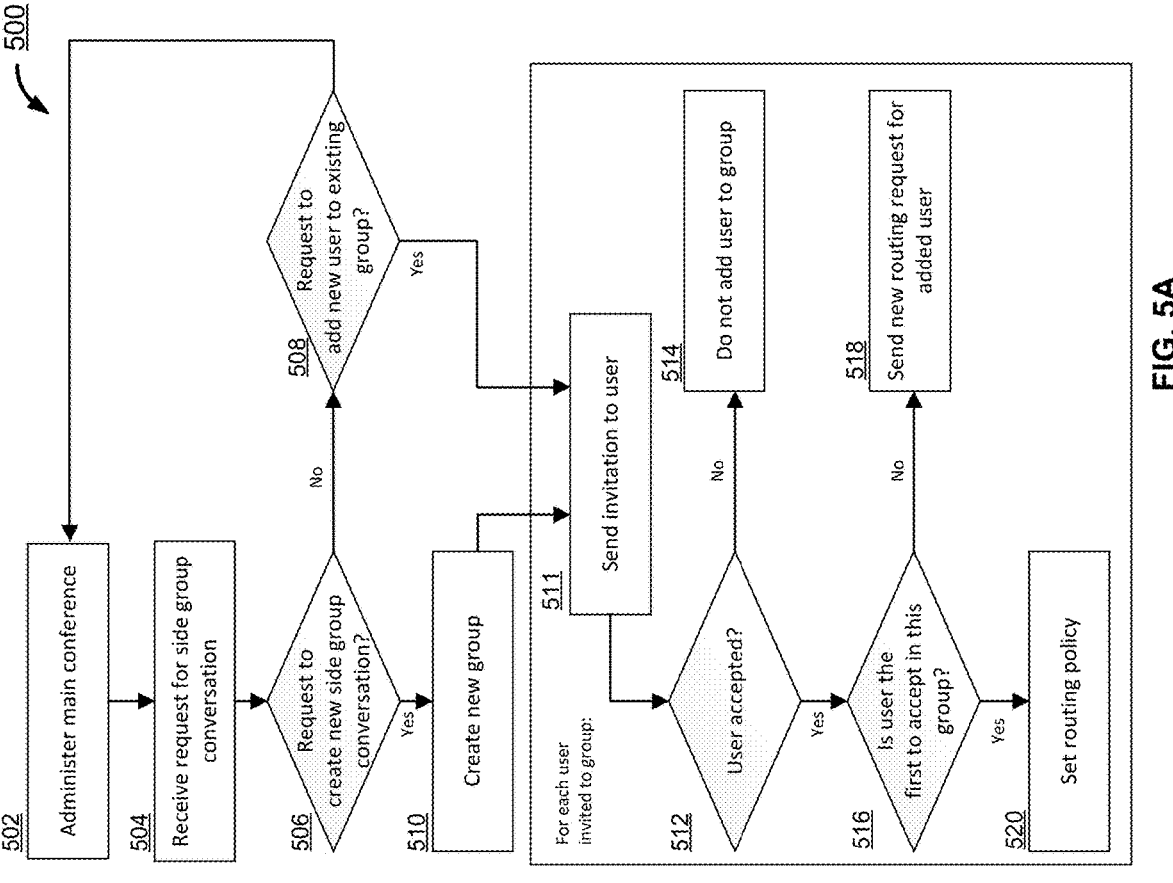
FIG. 5A is a flowchart showing illustrative steps involved in creating a side group conversation in a conference, in accordance with some embodiments of this disclosure.

FIG. 5A is a flowchart 500 showing illustrative steps involved in creating a side group conversation in a conference, in accordance with some embodiments of this disclosure. The conference may be an audio only conference, a video only conference, or a conference with both audio and video. In an embodiment, the system administers a conference meeting (e.g., a main meeting, in which a plurality of users attends) on a conferencing platform at step 502. At step 504, during the main conference, the system receives a request from one of the plurality of users relating to a side group conversation. At step 506, the system determines that the request is to create a side group conversation. The side group conversation can run on the conferencing platform at the same time as the main conference. The user may select a subgroup of the plurality of users to invite to the side group conversation. At step 510, the new side group is created and assigned a group ID. At step 511, an invitation is sent to each of the subgroup of users, wherein the invitation may include a request to join the newly created side group, the group ID, and the appropriate user ID of the invitee. If the request is to add a new user to an existing side group conversation (step 508), the request may include the group ID of the side group conversation and the user ID of the invited user. An invitation comprising a request to join the existing side group conversation with the group ID and the appropriate user ID is sent to the invited user at step 511.

At step 512, for each invited user, the system determines whether the user accepts the invitation to join the side group conversation. At step 514, if the user declines, a rejection response is sent to the system (e.g., to meeting manager 202) and no routes are created between the declining user and the audio mixer associated with the side group conversation. Moreover, no video feeds from the side group conversation will be included in the encoded video stream transmitted to the declining user. Thus, the declining user will not have access to audio or video streams of the side group conversation. In another embodiment, if it is determined that the user has insufficient resources to attend multiple groups (e.g., a device associated with the user is on a low bandwidth connection), the user is automatically denied from joining the group, or the user is automatically removed from the side group if he accepts the invitation.

At step 516, if the user accepts the invitation, the system determines whether the user is the first user to accept an invitation to the side group conversation. If so, a new routing policy will be configured for the side group conversation at step 520, starting with the first added user. For example, incoming audio and/or video streams from the first added user (e.g., when the user selects to speak in the side group conversation) will be associated with the user's ID and the group ID of the side group conversation, and the streams would be routed to the audio mixer of the side group conversation. Moreover, outgoing streams from the side group conversation will be associated with the group ID and the user ID of all users in the side group conversation and will be routed to each of the users. At step 518, if the invited user is not the first user to be added to the side group conversation, a new routing request for the added user will be sent to the system, and a corresponding new audio and/or video route will be added to the routing policy for the side group conversation. Audio and/or video streams will be routed between the added user and side group conversation such that the added user has access to the streams in the side group conversation and other users in the group can access the added user's streams directed to the conversation.

FIG. 5B is a flowchart 550 showing illustrative steps involved in inviting a voice assistant to a side group conversation, in accordance with some embodiments of this disclosure. In an embodiment, the system administers a conference meeting (e.g., a main meeting, in which a plurality of users attends) on a conferencing platform at step 552. While the main conference is ongoing, one of the users may request creation of a side group conversation comprising a subgroup of the plurality of users. At step 554, the system may receive a request from one of the users in the side group conversation to invite their voice assistant provider to the side group. A corresponding join request may be sent to the voice assistant provider. The join request can include grouping information of the voice assistant (e.g., voice assistant provider ID, user ID of the user hosting the invited voice assistant, group ID of the side group to which the voice assistant is invited, etc.). The join request can also include a routing request for the voice assistant in the group (e.g., to configure routes between the voice assistant and users in the side group).

At step 556, when the voice assistant has been added to the side group, the system may process the routing request and set routing policy for the voice assistant. In an embodiment, the routing policy may be based on the grouping of the voice assistant (e.g., to which side group the voice assistant has been added, which users are in the side group, etc.) and/or permissions policies associated with the voice assistant (e.g., which users within the side group may query the voice assistant, receive responses from the voice assistant, etc.). For example, each incoming audio and/or video stream may be assigned a user ID (e.g., an incoming user ID of the user originating the incoming stream), the group ID (of the side group in which the user is speaking or presenting and in which the voice assistant is added), and the voice assistant ID (of the voice assistant, which the particular user is permitted to query). Incoming audio and/or video streams from users permitted to query the voice assistant may be routed to the voice assistant provider and to other users in the group to hear the query. Meanwhile, incoming streams from users not permitted to query the voice assistant may be routed to only to other users in the group (e.g., the remainder of the group may hear and/or see the query even though the query will not reach the voice assistant). Each outgoing audio and/or video stream (e.g., corresponding query responses) may be assigned a user ID (e.g., outgoing user ID of the destination user permitted to receive the query response), the group ID (in which the voice assistant is added), and the voice assistant ID. The outgoing streams may be routed to each user in the subgroup permitted to receive such responses.

In another embodiment, a user from the main conference may invite the voice assistant provider to the main conference. The routing policy may be set such that streams between the voice assistant and users of the group are assigned a group ID of the main conference. Further in the embodiment, the voice assistant may be invited to multiple groups (e.g., both a main conference and side group conversation, in two side group conversations, etc.). Configuring grouping information for the voice assistant and setting routing policies accordingly can enable the voice assistant to simultaneously participate (e.g., process queries) in multiple groups. For example, different streams having the same voice assistant ID and user ID (e.g., incoming user ID or outgoing user ID) may be assigned different appropriate group IDs.

In another example, multiple voice assistants may be added to the same group. For example, after the voice assistant has been added to the side group conversation, another user in the side group conversation may invite a second voice assistant. Streams between the first voice assistant and users in the group may have the same group ID but a different voice assistant provider ID as streams between the second voice assistant and the users in the group. This allows for users in a side group to interact with two different voice assistants within the same group. In an embodiment, duplicate instances of the same voice assistant provider may be restricted. For example, if a third voice assistant provider were invited but has the same voice assistant provider ID as one of the previous two voice assistants (e.g., inviting the third voice assistant would result in two instances of an Amazon Alexa-supported voice assistant provider within the same side group conversation), then the third voice assistant provider may be restricted from being added to the group, avoiding duplicate routes from being configured.

Figure 6:
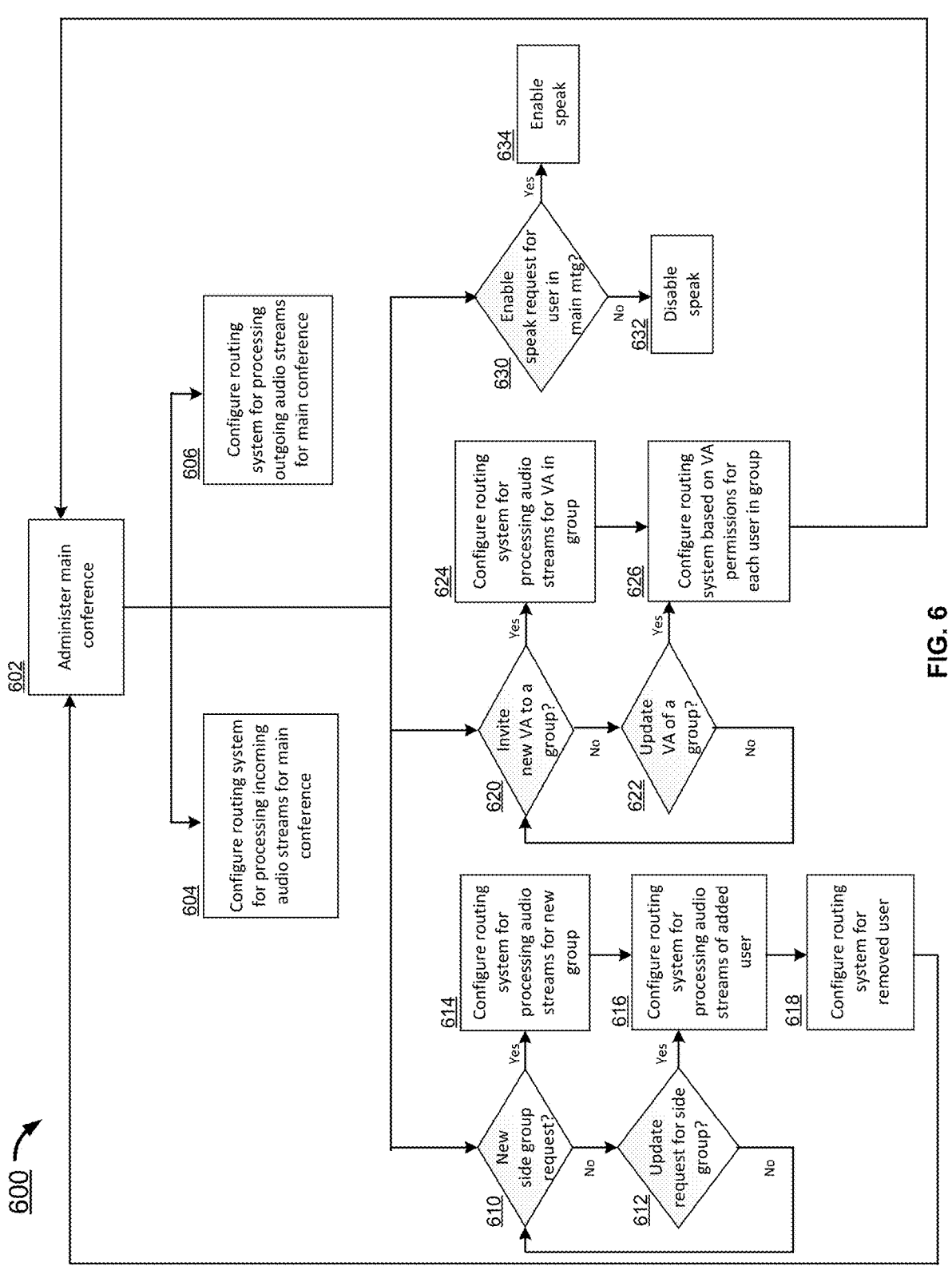
FIG. 6 is a flowchart showing illustrative steps involved in routing audio for newly created side group conversations and newly added voice assistant providers in a conference, in accordance with some embodiments of this disclosure.

FIG. 6 is a flowchart 600 showing illustrative steps involved in routing audio for newly created side group conversations and newly added voice assistants in a video conference, in accordance with some embodiments of this disclosure. In an embodiment, routing policies may be based on the group ID assigned to each incoming and outgoing audio (and video) stream. In the example, a main conference (e.g., main meeting) is administered at step 602. The group ID for audio and/or video streams belonging to (e.g., being transmitted to and from) the main conference may be set to a default value (e.g., null). Thus, all streams associated with a group ID of null would be routed only between users attending the main conference. At step 604, the routing system is configured for processing incoming audio streams to the main conference. For example, an incoming stream may be assigned a user ID of the user from which it originated. All incoming audio and/or video streams from each user may be demultiplexed (e.g., into separate audio and/or video streams) by each user's dedicated demultiplexer. Each user's demultiplexed audio stream is decoded by the user's dedicated audio decoder. Meanwhile, each user's demultiplexed video stream (if any) is decoded by the user's dedicated video decoder, described in further detail in FIG. 8. The decoded audio stream of each user is then routed to the dedicated audio mixer for the main conference.

At step 606, the routing system is configured for processing outgoing audio streams from the main conference. For example, an outgoing stream may be assigned a user ID of the destination user (e.g., receiving the stream). The main conference audio mixer mixes (e.g., optimizes, balances, etc.) incoming audio streams. All outgoing audio streams from main conference's audio mixer are sent to a dedicated audio encoder for the main conference. The encoded main conference audio stream is routed to the dedicated multiplexer of each user, wherein the audio stream is to be multiplexed with any corresponding encoded video stream of the main conference. The final multiplexed stream is then transmitted to each appropriate user of the main conference.

At step 610, a new side group request may be received. For example, meeting audio router 203 may receive a request to create a side group conversation, the request including incoming user IDs (e.g., for incoming streams from users invited to the side group) and a new group ID for the side group. At step 614, the routing system is configured for processing audio streams belonging to the newly created side group. For example, a new dedicated audio mixer instance is created for the side group, the audio mixer having the group ID of the side group. A new, dedicated audio encoder may also be created, also having the group ID of the side group. When users speak to each other within the side group conversation, all incoming audio streams (e.g., input audio) from users in the side group may be routed from the incoming user to the side group audio mixer and to the side group audio encoder. Once the side group has been created, or if a request to update (e.g., add or remove user) the side group is received at step 612, the routing system is configured for processing audio streams for each added user at step 616 and for each removed user at step 618. For example, streams may be routed between the added user and users already in the side group. For incoming streams with an incoming user ID of the added user (e.g., input audio from the added user), the route from the added user to the main conference audio mixer may be removed, and the stream is rerouted to the side group audio mixer. For example, the group ID of the incoming stream may be updated from null to group ID of the side group. For outgoing streams with an outgoing user ID of the added user (e.g., output audio received by the added user), the user's dedicated multiplexer is configured to receive and multiplex the addition of the new outgoing audio stream from the side group audio mixer (for instance, in addition to receiving and multiplexing an outgoing audio stream from the main conference audio mixer and/or dedicated audio mixer of another side group the user is in).

Further in the example, stream routes may be removed from between a user to be removed and the side group conversation. Outgoing streams (e.g., output audio received by the removed user) from the side group audio mixer are removed from the removed user's dedicated multiplexer. Meanwhile, outgoing streams from the side group audio mixer continue to be routed to remaining users in the side group. Incoming streams (e.g., input audio from the removed user) are removed from the input audio for the side group audio mixer. Meanwhile, incoming streams from remaining side group users continue to be routed as input audio for the side group mixer. For any incoming audio streams from the removed user thereafter, a route may be added from the removed user's demultiplexer and decoder to the main conference audio mixer (e.g., the group ID of incoming audio streams from the removed user is updated from the side group ID to null.

At step 620, a request to add a voice assistant provider to a group may be received. In an embodiment the group may be the main conference. In another embodiment, the group may be a side group conversation. At step 624, based on the request to add the voice assistant, the routing system is configured for processing audio streams between the voice assistant and participants in the group. In an embodiment, audio stream processing components may be instantiated for the voice assistant in the group. Once instantiated, streams are routed between the components based on group routing policies and/or permissions policies associated with the voice assistant. For example, a new audio mixer is instantiated for the voice assistant within the group. The audio mixer may be configured to receive and mix (e.g., optimize, balance, etc.) incoming audio streams (e.g., queries) from users in the group (who are permitted to interact with the voice assistant provider). The audio mixer may be assigned and identified by the voice assistant provider ID, the user ID (e.g., of the user hosting the voice assistant), and the group ID. A voice assistant provider handler with wake word detection may be instantiated, to detect a wake word in an incoming query and trigger the provision of voice assistant services (e.g., the query is transmitted over the network to the voice assistant provider to process the query and provider a response). The handler is assigned and identified by the voice assistant provider ID, user ID of the voice assistant's host, and the group ID. A dedicated audio decoder for the voice assistant may be instantiated for decoding responses received from the voice assistant provider over the network, wherein the decoder is assigned and identified by the voice assistant provider ID, the user ID of the voice assistant's host, and the group ID. A dedicated audio encoder for the voice assistant (or, in another example, for the group) may also be instantiated, wherein the encoder is assigned and identified by the voice assistant provider ID, the user ID of the voice assistant's host, and the group ID. The encoder may encode the responses received by the voice assistant provider prior to routing the response to the appropriate user(s)'s multiplexer. In an embodiment, the encoder may also encode the incoming query prior to transmitting the query the voice assistant provider. In another embodiment, another instance of a dedicated audio encoder for the voice assistant (or for the group) may be utilized to encode the incoming query.

Once the dedicated audio processing components have been instantiated, incoming and outgoing streams for the voice assistant provider may be routed to the appropriate components accordingly. For example, an incoming query audio from a user may be routed to the dedicated audio mixer, then to the voice assistant handler to detect the wake word, then to the dedicated audio encoder. The encoded query audio is then transmitted as an outgoing audio stream over the network to the voice assistant service provider (e.g., on a proprietary server associated with the voice assistant provider), where the be assistant provider processes the query and generates a response. The incoming response audio from the voice assistant provider is received and decoded by the dedicated audio decoder. The decoded incoming response audio is then routed to the voice assistant handler (e.g., to format the response to a user perceivable form, convert text to speech, etc.) and subsequently to dedicated audio encoder. The encoded response is then routed to the appropriate user.

In an embodiment, at step 626, the routing system may be further configured (or updated, step 622) based on voice assistant permissions for each user in the group. For example, the system may determine whether a user in the group is permitted to perform voice assistant queries (whether their user ID is within a set of permitted user IDs associated with the voice assistant). The system may also determine whether routes have been configured for incoming audio streams associated with the user's user ID to the voice assistant provider. If the user is permitted to query the voice assistant, a route will be configured for incoming streams from the user to the voice assistant provider (e.g., to the dedicated audio mixer of the voice assistant provider), if such a route has not already been configured. If the user is not permitted to query the voice assistant, any existing route between the user and the voice assistant (e.g., the dedicated audio mixer of the voice assistant provider) is removed. The system may also determine whether the user is permitted to receive responses from the voice assistant. The system may further determine whether routes have been configured for outgoing audio streams associated with the user ID from the voice assistant provider. If the user is permitted to receive responses from the voice assistant, a route will be configured for outgoing streams from the voice assistant provider (e.g., from the dedicated audio encoder of the voice assistant) to the user (e.g., to the dedicated multiplexer of the user), if such a route has not already been established. If the user is not permitted to receive responses from the voice assistant, any existing route from the voice assistant provider (e.g., the dedicated audio encoder of the voice assistant) to the user (e.g., the dedicated multiplexer of the user) is removed.

In some embodiments, a user may wish to continue participating in the side group conversation (e.g., continue streaming the side group video) while temporarily speaking in the main conference. At step 630, during a side group conversation, the system may receive the user's request to speak in the main conference. At step 634, the system may enable speaking in the main conference by removing the route for incoming audio streams from the user to the side group audio mixer and rerouting the stream to the main conference audio mixer. At step 632, the user may choose to resume speaking in the side group conversation. The system may disable speaking in the main conference by removing the route for incoming audio streams from the user to the main conference audio mixer and rerouting the stream to the side group audio mixer.

Figure 7:
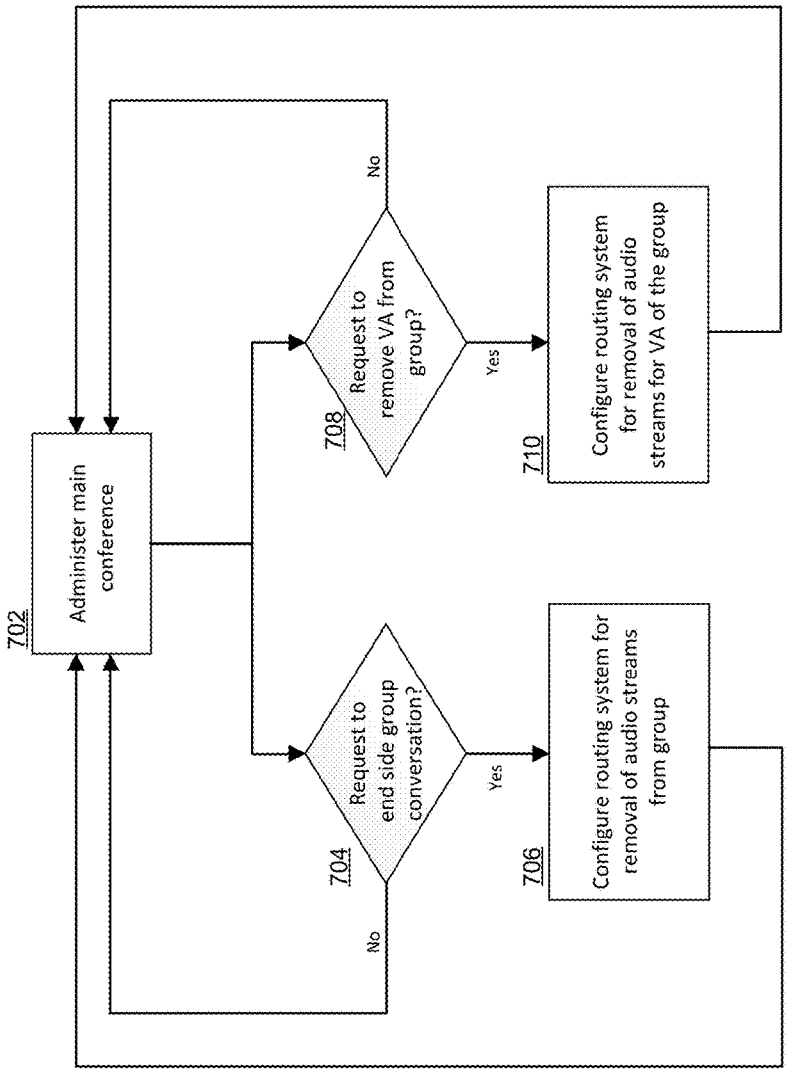
FIG. 7 is a flowchart showing illustrative steps for terminating side group conversations and removing voice assistant providers from a conference, in accordance with some embodiments of this disclosure.
Figure 7:
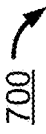

FIG. 7 is a flowchart 700 showing illustrative steps for terminating side group conversations and removing voice assistants from a video conference, in accordance with some the embodiments of this disclosure. At step 702, administration of a main conference may be in progress, from which at least one side group conversation has been created and is also in progress. At step 704, if a request to end the side group conversation is received, then at step 706 the routing system is configured for removal of audio stream routes between the users and the side group are removed. For example, in a side group (e.g., 206), the route from the side group audio mixer (e.g., 242) to the side group dedicated audio encoder (e.g., 342) is removed. For each user in the group (e.g., users 212, 215, and 216 in side group conversation 206), the route for outgoing streams (e.g., encoded output audio to be received by the user) from the side group audio mixer (e.g., 242) to the user's dedicated multiplexer (e.g., 322, 325, 326, respectively) is removed. For each user, the route for incoming streams (e.g., decoded input audio from the user) from the user to the input audio of the group audio mixer (e.g., 242) is also removed. Further for each user, a route may be added to direct incoming user audio streams to the main conference audio mixer (e.g., 240). In an embodiment, after routes are removed, the audio mixer instance (e.g., 242) and dedicated audio encoder (e.g., 342) associated with the group ID of the side group (e.g., 206) may be removed.

At step 708, if a request to remove a voice assistant from the side group is received, then at step 710 the routing system is configured for removal of audio stream routes for the voice assistant in the group. In an embodiment, the route for outgoing audio streams (e.g., decoded user queries) from the video conferencing system (e.g., 201) to the voice assistant provider (e.g., 272) can be removed. For example, routes are removed from the voice assistant handler (e.g., 251) to the dedicated encoder of the voice assistant (e.g., 261), and from the dedicated audio mixer (e.g., 241) of the voice assistant in the group to the voice assistant handler (e.g., 251). In an embodiment, the route for incoming audio streams (e.g., decoded voice assistant responses) from the voice assistant provider (e.g., 272) to the video conferencing system (e.g., 201) can be removed. For example, routes are removed from the voice assistant provider (e.g., 272) to the voice assistant handler (e.g., 251), and from the voice assistant handler (e.g., 251) to the dedicated audio encoder (e.g., 341) of the voice assistant. For each user in the group (e.g., users 212, 215, and 216 in side group 206), the system may determine whether there is a route for incoming query streams from the user to the voice assistant provider (e.g., 272), in other words, whether the user is permitted to query the voice assistant provider. If such a route exists, the route is removed for incoming user query streams from the user (e.g., 212, 215, 216 of side group 206) to the side group audio mixer (e.g., 242 for side group 206). Also for each user in the group, the system may determine whether there is a route for outgoing response streams from the voice assistant provider (e.g., 272) to the user (e.g., 212, 215, 216), in other words, whether the user is permitted to receive responses from the voice assistant provider. If such a route exists, the route is removed for outgoing voice assistant responses from the voice assistant provider (e.g., 272 for side group 206) to the user's dedicated multiplexer (e.g., 322, 325, 326 of users 212, 215, 216, respectively of side group 206). After removal of routes, instances of dedicated audio processing components for the voice assistant provider in the group (e.g., component instances associated with the voice assistant ID and group ID) may be removed. For example, for voice assistant provider 272 in side group 206, its audio mixer 243, voice assistant handler 253, audio decoder 363, voice assistant provider encoder 264, and side group encoder for the voice assistant 343 are removed.

Figure 8:
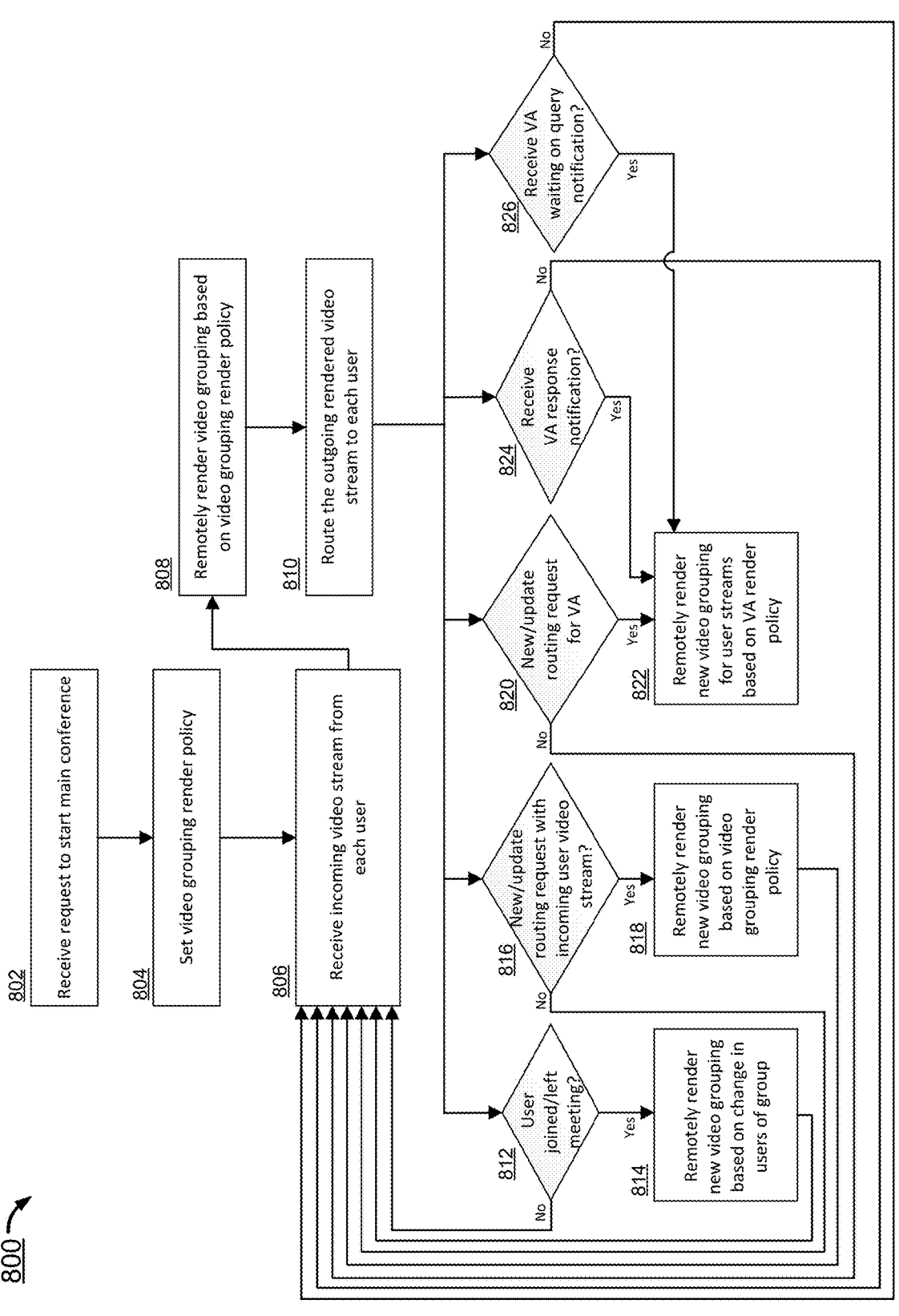
FIG. 8 is a flowchart showing illustrative steps for remote video rendering for side group conversations of a conference, in accordance with some embodiments of this disclosure.

FIG. 8 is a flowchart 800 showing illustrative steps for remote video rendering for side group conversations of a conference, in accordance with some embodiments of this disclosure. In an embodiment, the conference may be a video only conference. In other embodiments, the conference may be a video conference with audio. In an embodiment, a request is received to start a conference (e.g., main meeting) at step 802. The main conference may be initiated, and may be assigned a null group ID. A plurality of users is added to the group (e.g., main conference). At step 804, a video grouping render policy (also referred to as video render layout policy) is set. In an embodiment, the video grouping render policy defines the layout for each user (e.g., how video feeds from all of the groups that the user is in are grouped as a single video feed for the user). The video grouping may include graphical user interface elements for representing various features of the group sessions and defines the arrangement of such elements when rendering the video. The video grouping render policy may be based on the group (e.g., identity of the groups, which groups are in progress, which groups are available for new participants, etc.), on the user (e.g., which groups the user is a member of), and so forth. In an embodiment, the layout for each group may be fixed. For example, icons corresponding to each user in the main conference may be displayed for each user. In another embodiment the layout for each group and/or the video grouping may be customizable for each user. Icons of users in the same group as the viewing user (for which the layout or video grouping is particularly rendered) may be sorted, placed, or rendered with a particular graphical style which distinguishes them from icons of other users not in the same group. In another example, in a display on a user's device, multiple windows may correspond to the multiple groups that the user is in, wherein within each window the appropriate group's video is streamed. Each window may be displayed in different graphical styles (e.g., color, icons, animations, etc.) to distinguish each group and/or its participants. Therefore, where a main conference includes a plurality of users, and each user is participating in various combinations of groups (for instance, one user may be in the main conference only, another user is in the main conference and a side group, and another user is in the main conference and two other side groups, and so forth), each user may be associated with a different video grouping render policy and their respective video groupings may be rendered accordingly.

At step 806, incoming video streams (e.g., input video) from each user is received. When a user participates in a group meeting (e.g., whether a main conference or side group conversation), input from the user may comprise a combination of audio and video streams. Their input is routed to a dedicated demultiplexer of the user to separate the audio and/or video streams, wherein the audio stream is routed to a dedicated audio decoder of the user and/or the video stream is routed to a dedicated video decoder of the user.

At step 808, the video grouping is remotely rendered based on the video grouping render policy. A video grouping processor may collect and combine incoming video streams from each user in each group. Based on grouping policies, group IDs associated with incoming video streams, and/or video grouping render policies, the system may identify which group(s) each user is in. The system may render and route to the user video streams from participants from each of those groups (and arranged by each group) at step 810. For example, for a user participating only in a single group (such as the main conference), video streams from all users in the main conference (e.g., comprising video of their participation in the main conference) may be collected, grouped, and rendered as a single window showing video streams of each main conference participant, and the rendered window may be routed to the user. In another example, the user may join a side group conversation of three users. The video display for the user may include two windows- one for video streams of the main conference participants and the other for video streams of the side group partici- pants. For the side group conversation, input video streams from the three users may be received, combined, rendered as a video window showing three participants, and the rendered video window may be routed to each of the three participants in the side group.

At step 812, if a user has joined or left a group meeting, a new video grouping is remotely rendered based on the current users in the group at step 814. For example, a display window may be rendered for a particular group, wherein the window comprises a plurality of video streams of each group participant (e.g., three participant streams for a side group comprising three users). If another user joins the group, the window may be updated to include the video of the new user in the plurality of video streams of the group participants (e.g., increase the number of participant streams from three to four). If one of the users exits the group, the window may be updated such that his video stream is removed from the plurality of video streams of group participants (e.g., decrease the number of participant streams from three to two).

At step 816, if a new routing request for a new side group or a request to update routing in an existing side group is received, a new video grouping for the users is rendered based on the video grouping render policy at step 818. For example, if the request is to create a new side group with a subgroup of three users from the main conference, a video grouping may be configured such that video streams of the three users are rendered in a window for the side group. In another example, for each of the three users, the display on their respective devices may be configured to render a main conference window comprising video streams of the main conference participants (e.g., all users) and a side group window comprising video streams of the three side group users. In yet another example, if the request is to update an existing side group (such as add a user to the side group, move a user from one side group to another side group, etc.), the video grouping may be updated to reflect the user's change in participation in a group. For example, if a user in a main conference has joined a side group, his rendered video grouping may be updated from rendering a single window (e.g., main conference video streams) to two win- dows (e.g., main conference video streams and side group video streams). If the user leaves the side group, his rendered video grouping may be updated to remove the side group window, such that the only window displayed on his device is that of the main conference. In another example, the update request may be to terminate a side group (e.g., terminating the routes between users in the side terminated group). When routes between the terminated side group and the former users in the side group have been removed, and instances of video and/or audio processing components for the side group have been removed, the video grouping may be updated to reflect the removal, such as by removing the side group window from display on the former side group users' devices.

At step 820, if a new request to invite a voice assistant provider to a group or request to update routing for a voice assistant provider in a group is received, then a new video grouping for users may be rendered based on a voice assistant render policy at step 822. In an embodiment, the voice assistant render policy may define arrangement of graphical elements associated with the voice assistant's activity in a group. The voice assistant render policy may be based on the group that the voice assistant provider is in, the users in the group, the permissions policy for users in the group (e.g., whether a user in the group may query and/or receive response from the voice assistant), and so forth. For example, a voice assistant is added to a side group of three users (e.g., users 212, 215, and 216 in side group conver- sation 206). All three users are permitted to receive responses from the voice assistant, but only two of the users (e.g., users 212 and 216) have permission to query the voice assistant. Routing policies for the video streams are imple- mented accordingly (as described in FIG. 4). The video grouping for the user without permission to query the voice assistant (e.g., user 215) may include a window for video streams from the main conference and a window for video streams from the side group conversation, wherein the window for the side group conversation includes video streams from all three users and of responses from the voice assistant (e.g., graphical elements indicating that the voice assistant is responding, voice assistant responses in video format such as a video result from an internet search, etc.). Meanwhile, the video grouping for the users with querying permission (e.g., users 212 and 216) may include a window for the main conference video stream and a window for the side group video stream, wherein the side group window includes video responses from the voice assistant as well as a rendered icon of the voice assistant indicating that it is available to receive queries.

In another embodiment, if a notification is received at step 824 of an incoming voice assistant responses to a query, or if a notification is received at step 826 indicating that the voice assistant is awaiting the next query, such activity will be remotely rendered in the appropriate video grouping at step 822. For example, a graphical element may be rendered in the video of the group window to indicate such notifica- tions.

Figure 9:
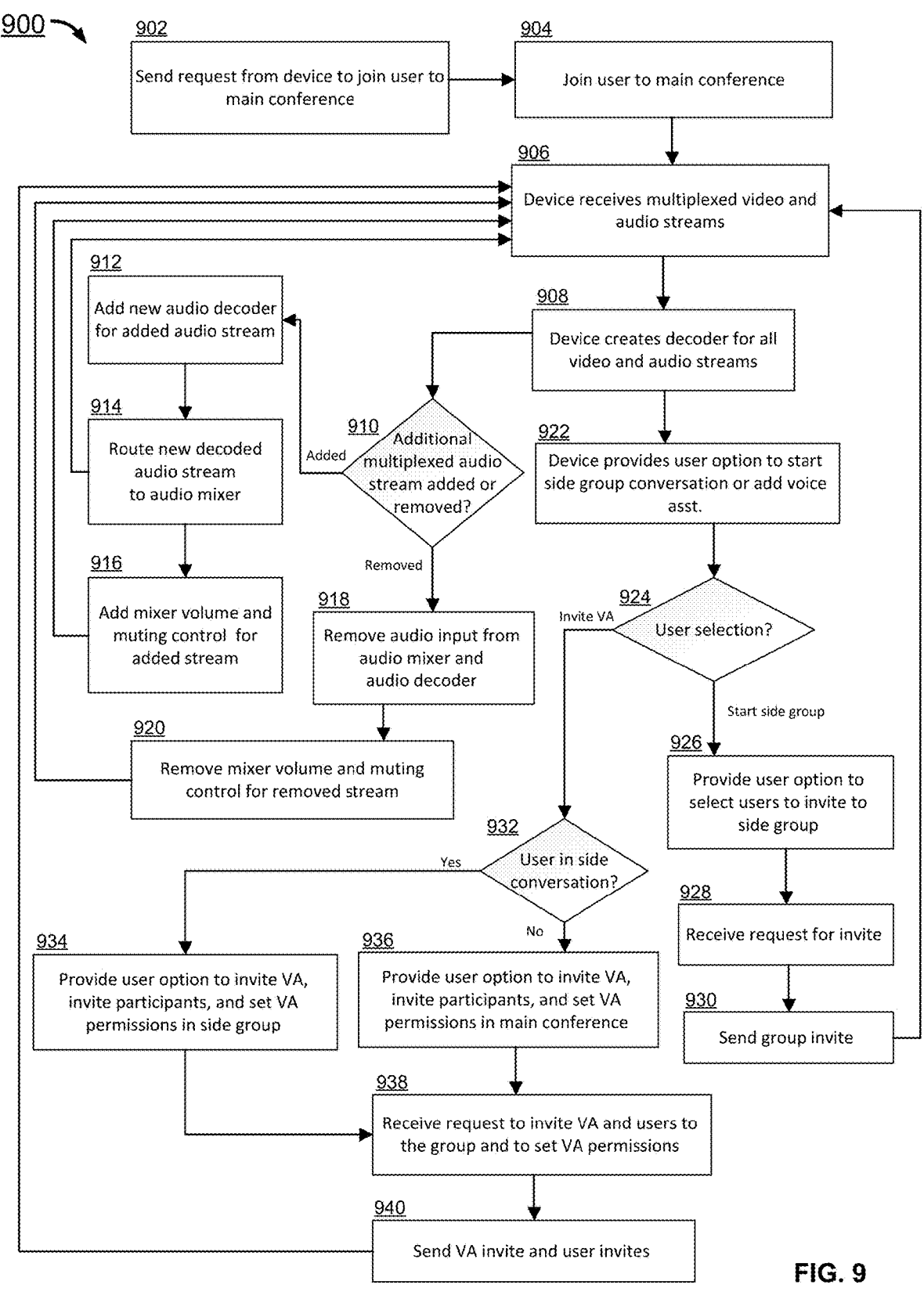
FIG. 9 is a flowchart showing illustrative steps for device policy setting on a client device for management of side group conversations and voice assistant services in a conference, in accordance with some embodiments of this disclosure.

FIG. 9 is a flowchart 900 showing illustrative steps for device policy setting on a client device for management of side group conversations and voice assistant services through a video conference system server, in accordance with some embodiments of this disclosure. In an embodi- ment, at step 902, a request is sent to the server from a computing device associated with the user, wherein the user requests (or accepts an invitation) to join a main conference through a video conferencing application on the user's device. In an embodiment, the video conferencing applica- tion may be supported by the video conference system server over a network. At step 904, the user is added to the main conference. At step 906, the device receives multiplexed video and audio streams of participants in the main conference. At step 908, the device instantiates a dedicated decoder for each incoming video and audio stream if one has not already been created. For example, if the user belongs to two groups (e.g., main conference and a side group conversation), the device may receive a video stream configured for the user (e.g., of a video grouping comprising video streams of the two groups), an audio stream of the main conference, and an audio stream of the side group conversation. The device may thus create a video decoder for the video stream, a first audio decoder for the main conference audio stream, and a second audio decoder for the side group audio stream. In an embodiment, the device may comprise an audio mixer for all incoming audio streams. The audio mixer may be configured to mix (e.g., equalize, balance, adjust volume, muting controls, etc.) various audio streams based on the group, on user preferences, and the like. In another embodiment, the device may instantiate a dedicated audio mixer for streams from each group that the user is in.

At step 910, if an additional multiplexed audio stream is received (e.g., audio stream from a second side group that the user has joined), the device instantiates a new audio decoder for the added audio stream. The new and decoded audio stream is then routed from the new decoder to the audio mixer. At step 916, the audio mixer may balance, equalize, adjust volume, implement muting control, and so forth to the added stream. In one example, the audio mixer may be configured to mix audio streams such that audio from one group meeting is played through one speaker of the device, while the audio from another group meeting is played through an external speaker coupled to the device. In another example, the audio mixer may mix streams such that audio streams from both groups are sent to the same speaker on the device, but one plays at a higher volume than the other, or one is muted at specific times during the conference, and so forth.

Alternatively, at step 910, if an audio stream is removed (e.g., audio stream from a side group is removed because the user has left the side group), then the audio stream is removed as audio input for the audio mixer and the audio decoder for the side group. At step 918. At step 920, the configurations of the audio mixer for streams from the side group are removed (e.g., remove volume mixing policies, muting controls, etc. of the audio mixer relating to the removed side group audio streams).

At step 922, the device provides the user to start a new side group conversation and/or invite a voice assistant to a side group. At step 924, if the user selects to start a new side group conversation, the device provides the user an option (e.g., by way of a graphical user interface element) to select users (e.g., from the main conference) to invite to the side group at step 926. At step 928, the device receives the user's selection to invite the user, and at step 930, the device sends the invitation to the users (or via the video conferencing system server).

In another embodiment, at step 924, if the user selects to invite a voice assistant provider to a side group conversation, the device determines whether the user has made the selection while in a side group conversation at step 932. At step 934, if the user is in a side group when selecting to invite the voice assistant, the device may provide the user an option (e.g., by way of a graphical user interface element) to invite the voice assistant, invite participants to the side group, and/or set voice assistant permissions for users in the side group. Alternatively, at step 936, if the user is in the main conference when selecting to invite the voice assistant, the device may provide the user an option to invite the voice assistant, invite other participants, and/or set voice assistant permissions in the main conference. At step 938, the device may receive the user's selection to invite a voice assistant, other participants, and/or set permissions for the voice assistant in the group. At step 940, the device sends the invitations to the voice assistant provider and the invited participants.

Figure 10:
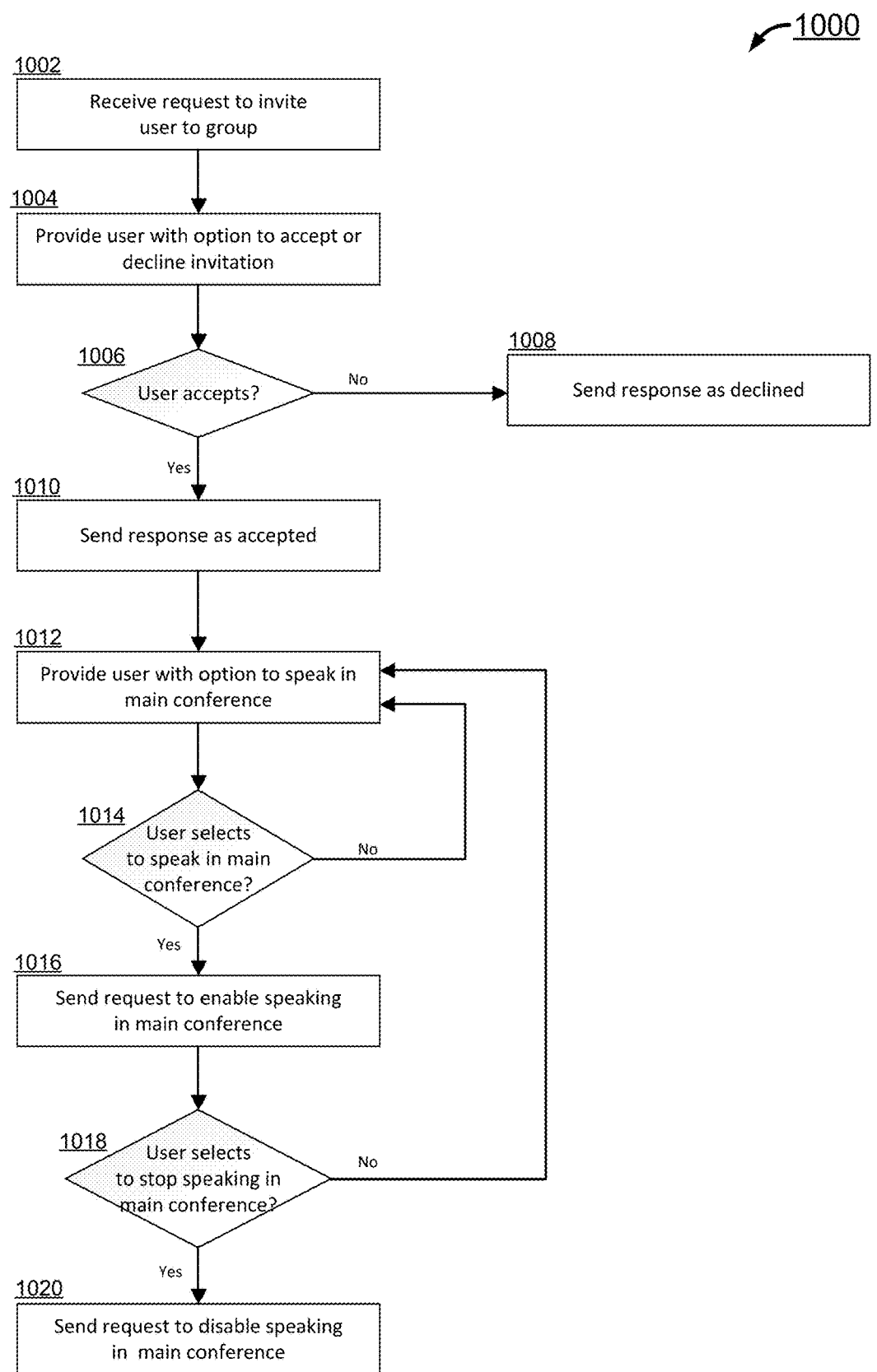
FIG. 10 is a flowchart showing illustrative steps for accepting a side group conversation request on a client device application, in accordance with some embodiments of this disclosure.

FIG. 10 is a flowchart 1000 showing illustrative steps for accepting a side group conversation request from a video conference system server on a client device application, in accordance with some embodiments of this disclosure. In an embodiment, at step 1002, a computing device associated with the user may receive a request to invite the user to join a group. At step 1004, the device may provide to the user an option (e.g., by way of a graphical user interface element) to accept or decline the invitation. At step 1006, the device determines whether the user has accepted the invitation. If the user declines, the device sends a response as declined to the video conference system server at step 1008. The user will not be added to the group and will not be granted access to any audio or video from the group. If the user accepts, the device sends a response as accepted at step 1010. At step 1012, the device provides the user with an option (e.g., by way of a graphical user interface element) to speak in the main conference while the user is attending the side group conversation. At step 1014, the device determines whether the user has made the selection to speak in the main conference. If so, the device sends the request to the video conference system server to enable the user to speak in the main conference at step 1016. For example, incoming audio from the user may be rerouted, such that his audio stream is directed to the main conference audio mixer instead of the side group audio mixer. At step 1018, the device determines whether the user has selected to stop speaking in the main conference (e.g., and resume speaking in the side group conversation). If so, the device sends the request to the video conference system server to disable the user from speaking in the main conference at step 1020.

Figure 11:
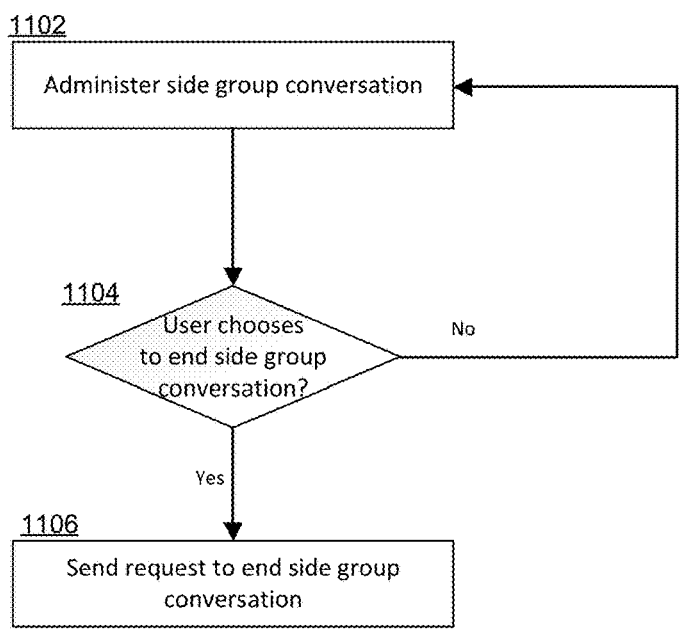
FIG. 11 is a flowchart showing illustrative steps for terminating side conversations on a client device application, in accordance with some embodiments of this disclosure.

FIG. 11 is a flowchart 1100 showing illustrative steps for terminating side conversations on a client device application, in accordance with some embodiments of this disclosure. In an embodiment, at step 1102, a side group conversation has been created and is in progress. At step 1104, the device may determine whether the user selects to end the side group conversation. If so, the device sends a request to the video conference system server to terminate the side group at step 1106. Routes between users in the side group are removed and the users are no longer able to communicate with each other through the side group.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
providing a conference session, wherein a plurality of user devices is added to the conference session, and wherein a first user device of the plurality of user devices is associated with a first voice assistant;
receiving, from a second user device of the plurality of user devices, a first query directed to the first voice assistant;
based on determining that the second user device is permitted to access the first voice assistant based on permissions data associated with the first voice assistant, routing a first audio stream corresponding to the first query from the second user device to the first voice assistant;
receiving, from a third user device of the plurality of user devices, a second query directed to the first voice assistant; and
based on determining that the third user device is not permitted to access the first voice assistant based on the permissions data associated with the first voice assistant, refraining from routing a second audio stream corresponding to the second query from the third user device to the first voice assistant.

2. The method of claim 1, wherein the first query and the second query each comprise a wake word associated with the first voice assistant.

3. The method of claim 1, further comprising:
routing the second audio stream corresponding to the second query from the third user device to each of the first user device and the second user device.

4. The method of claim 1, further comprising:
receiving, from the first voice assistant, audio data;
based on the permissions data associated with the first voice assistant, routing the audio data to each of the first user device, the second user device, and the third user device.

5. The method of claim 1, further comprising:
receiving, from the first voice assistant, audio data;
based on the permissions data associated with the first voice assistant:
routing the audio data to each of the first user device and the second user device; and
refraining from routing the audio data to the third user device.

6. The method of claim 1, wherein the second user device is associated with a second voice assistant.

7. The method of claim 6, further comprising:
receiving, from the third user device, a third query directed to the second voice assistant; and
based on determining that the third user device is permitted to access the second voice assistant based on permissions data associated with the second voice assistant, routing a third audio stream corresponding to the third query from the third user device to the second voice assistant.

8. The method of claim 6, wherein the first voice assistant is associated with a first voice assistant service provider and the second voice assistant is associated with a second voice assistant service provider different from the first voice assistant service provider.

9. The method of claim 1, further comprising:
creating a side conversation from the conference session;
identifying participants for the side conversation; and
based on the identified participants, inviting the first user device, the second user device, and the first voice assistant to the side conversation.

10. The method of claim 9, wherein the permissions data associated with the first voice assistant is based at least in part on the identified participants for the side conversation.

11. A system comprising:
control circuitry configured to:
provide a conference session, wherein a plurality of user devices is added to the conference session, and wherein a first user device of the plurality of user devices is associated with a first voice assistant;
input/output (I/O) circuitry configured to:
receive, from a second user device of the plurality of user devices, a first query directed to the first voice assistant;
wherein the control circuitry is further configured to:
based on determining that the second user device is permitted to access the first voice assistant based on permissions data associated with the first voice assistant, route a first audio stream corresponding to the first query from the second user device to the first voice assistant;
wherein the I/O circuitry is further configured to:
receive, from a third user device of the plurality of user devices, a second query directed to the first voice assistant; and
wherein the control circuitry is further configured to:
based on determining that the third user device is not permitted to access the first voice assistant based on the permissions data associated with the first voice assistant, refrain from routing a second audio stream corresponding to the second query from the third user device to the first voice assistant.

12. The system of claim 11, wherein the first query and the second query each comprise a wake word associated with the first voice assistant.

13. The system of claim 11, wherein the control circuitry is further configured to
route the second audio stream corresponding to the second query from the third user device to each of the first user device and the second user device.

14. The system of claim 11:
wherein the I/O circuitry is further configured to:
receive, from the first voice assistant, audio data; and
wherein the control circuitry is further configured to:
based on the permissions data associated with the first voice assistant, route the audio data to each of the first user device, the second user device, and the third user device.

15. The system of claim 11:
wherein the I/O circuitry is further configured to:
receive, from the first voice assistant, audio data; and
wherein the control circuitry is further configured to:
based on the permissions data associated with the first voice assistant:
route the audio data to each of the first user device and the second user device; and
refrain from routing the audio data to the third user device.

16. The system of claim 11, wherein the second user device is associated with a second voice assistant.

17. The system of claim 16:

wherein the I/O circuitry is further configured to:

receive, from the third user device, a third query directed to the second voice assistant; and wherein the control circuitry is further configured to:

based on determining that the third user device is permitted to access the second voice assistant based on permissions data associated with the second voice assistant, route a third audio stream corresponding to the third query from the third user device to the second voice assistant.

18. The system of claim 16, wherein the first voice assistant is associated with a first voice assistant service provider and the second voice assistant is associated with a second voice assistant service provider different from the first voice assistant service provider.

19. The system of claim 11, wherein the control circuitry is further configured to:

create a side conversation from the conference session;

identify participants for the side conversation; and based on the identified participants, invite the first user device, the second user device, and the first voice assistant to the side conversation.

20. The system of claim 19, wherein the permissions data associated with the first voice assistant is based at least in part on the identified participants for the side conversation.

* * * * *